US012598053B2

(12) United States Patent
Banin et al.

(10) Patent No.: US 12,598,053 B2
(45) Date of Patent: Apr. 7, 2026

(54) DISTRIBUTED RADIO FEED-FORWARD CLOCK SYNCHRONIZATION

(71) Applicant: Intel Corporation, Santa Clara, CA (US)

(72) Inventors: Elan Banin, Raanana (IL); Evgeny Shumaker, Nesher (IL); Avishay Friedman, Petach Tikva (IL); Ofir Degani, Haifa (IL)

(73) Assignee: Intel Corporation, Santa Clara, CA (US)

( * ) Notice: Subject to any disclaimer, the term of this patent is extended or adjusted under 35 U.S.C. 154(b) by 858 days.

(21) Appl. No.: 17/709,688

(22) Filed: Mar. 31, 2022

(65) Prior Publication Data

US 2023/0318801 A1 Oct. 5, 2023

(51) Int. Cl.
*H04W 56/00* (2009.01)
*H04L 7/00* (2006.01)
*H04L 7/04* (2006.01)
*H04W 88/08* (2009.01)

(52) U.S. Cl.
CPC .............. *H04L 7/0016* (2013.01); *H04L 7/04* (2013.01)

(58) Field of Classification Search
None
See application file for complete search history.

(56) References Cited

U.S. PATENT DOCUMENTS

| | | | | |
|---|---|---|---|---|
| 12,003,350 B1 * | 6/2024 | McCormick | ....... | H04B 7/18513 |
| 2017/0339675 A1 * | 11/2017 | Liu | ........................ | H04L 5/0051 |
| 2018/0054269 A1 * | 2/2018 | Cui | ...................... | H04J 11/0036 |
| 2023/0035992 A1 * | 2/2023 | Zhang | ............... | H04W 72/1268 |
| 2023/0319750 A1 * | 10/2023 | Balevi | .................. | H04B 17/391 |
| | | | | 370/329 |

FOREIGN PATENT DOCUMENTS

| | | | | | |
|---|---|---|---|---|---|
| CN | 106664274 A | * | 5/2017 | ............. | H04L 27/16 |
| EP | 4123941 A1 | * | 1/2023 | ......... | H04L 27/2613 |
| JP | 2012034376 A | * | 2/2012 | | |
| WO | WO-03073676 A2 | * | 9/2003 | ............ | H04W 84/10 |

* cited by examiner

*Primary Examiner* — Mohammed Rachedine
(74) *Attorney, Agent, or Firm* — Schwegman Lundberg & Woessner, P.A.

(57) ABSTRACT

A radio-head apparatus can comprise synchronization circuitry to receive transmission data and a phase correction signal. The synchronization circuitry can process the transmission data and the phase correction signal to generate digital transmitter (DTX) codes. The radio-head can further include transmission circuitry to combine the phase correction signal with transmission data codes to be provided to the DTX for transmission over an air interface. Other systems and apparatuses are described.

20 Claims, 15 Drawing Sheets

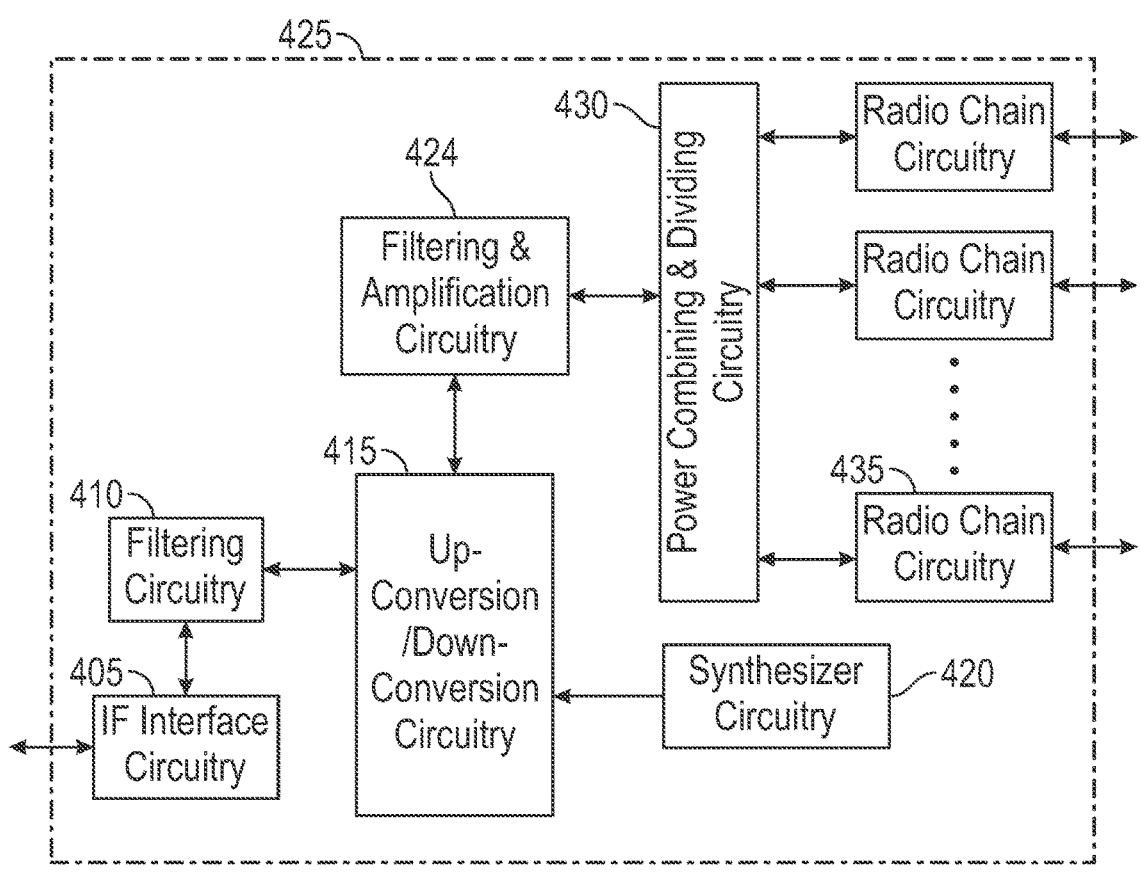
FIG. 4
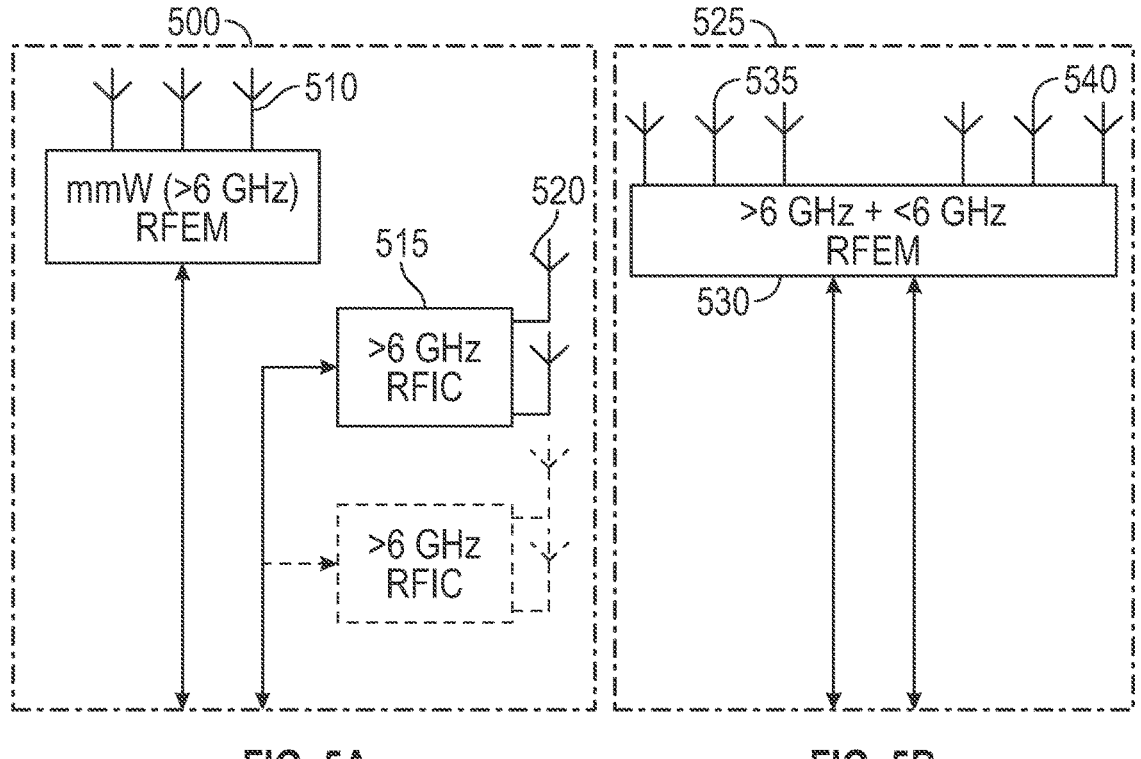
FIG. 5A                    FIG. 5B

FIG. 10B

DISTRIBUTED RADIO FEED-FORWARD CLOCK SYNCHRONIZATION

TECHNICAL FIELD

Aspects of the disclosure pertain to radio frequency (RF) communications. More particularly, aspects relate to synchronization circuitry for RF communications.

BACKGROUND

Distributed radio systems hold the promise of revolutionizing the industrial design of a client system by allowing flexibility in radio frequency (RF) interface placement as well as unlocking millimeter-wave communication standards (where RF front-end/antenna proximity is necessary). Signals provided in such distributed radio systems need to be time- and phase-aligned to comply with regulatory standards.

BRIEF DESCRIPTION OF THE DRAWINGS

In the drawings, which are not necessarily drawn to scale, like numerals may describe similar components in different views. Like numerals having different letter suffixes may represent different instances of similar components. Some aspects are illustrated by way of example, and not limitation, in the figures of the accompanying drawings in which:

FIG. 4 illustrates exemplary useable RF circuitry in FIG. 3A according to some aspects.

FIG. 5A illustrates an aspect of an exemplary radio front end module (RFEM) according to some aspects.

FIG. 5B illustrates an alternate aspect of an exemplary radio front end module, according to some aspects.

FIG. 10B illustrates a schematic drawing of a second system comprised of two RHs with according to some aspects.

DETAILED DESCRIPTION

Figure 1:
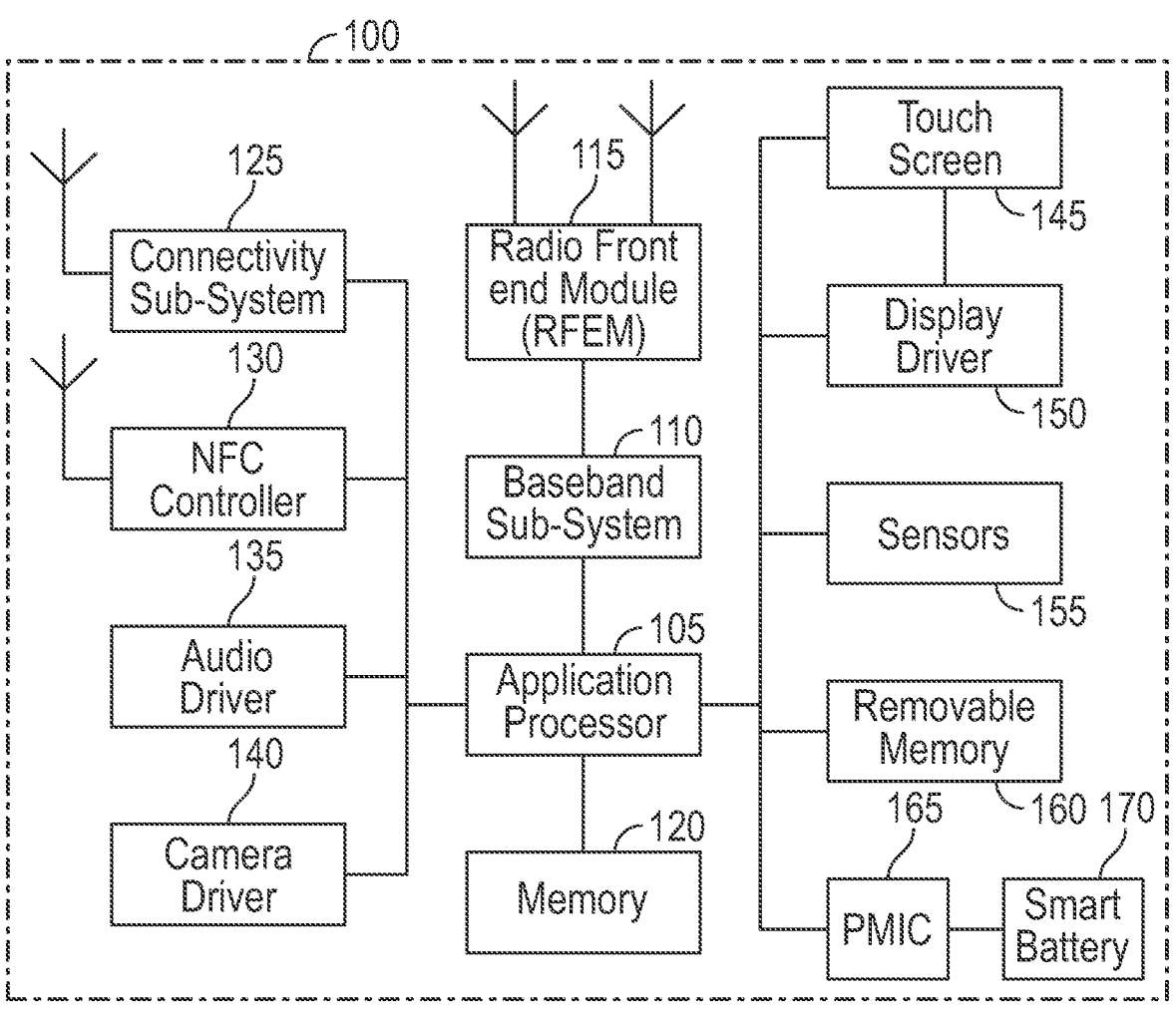
FIG. 1 illustrates an exemplary user device according to some aspects.

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Distributed radio systems, or radio-heads (RHs) hold the promise of revolutionizing the industrial design of a client system by allowing flexibility in radio frequency (RF) interface placement as well as unlocking millimeter-wave communication standards that make use of close RF front-end/antenna proximity. Governmental regulations specify that RHs include internal high stability frequency sources, and many manufacturers utilize a quartz crystal as a frequency source.

In systems comprising two or more RHs, each having its own crystal source, each RH can generate a different carrier frequency (with a number of parts-per-million (ppm) offset between them). Multiple antenna setups (be that multiple-input-multiple-output (MIMO) or beam-forming variety) are to be designed to produce time- and phase-aligned signals with virtually no ppm (e.g., less than about 1 parts-per-billion (ppb)) error between the signals. Any difference between center frequencies of the signals produced by the two (or more) antennas will result in a growing phase offset. In long packets, even a small frequency offset can cause significant phase offset and significant degradation for transmitted signal quality.

Previous solutions addressed RH synchronization by attempting to perform offset correction in a reference source (e.g., a crystal oscillator), or by providing synthesizer frequency control word correction (e.g., by changing a reference multiplication ratio). However, crystal correction can be limited due to the fundamental performance requirements of a reference source; a crystal needs to be highly coherent to adhere to stringent system requirements of spectral purity. Addition of a tuning mechanism in the form of, e.g., a crystal oscillator, is in direct contradiction to that requirement as it will inevitably lower the quality factor, hence deteriorating the performance of the reference clock. Furthermore, due to high quality factor, the tuning is limited to very modest rates, severely limiting the control loop bandwidth. Other solutions are limited by noise coloring and spurs. Previous solutions also have bandwidth limitations imposed by correction loop latency, which stems from the feedback nature of the correction).

Aspects of the disclosure address these and other concerns by injecting the phase correction aimed at aligning the multiple transmitted streams without affecting local reference sources and/or the synthesizers. Aspects provide at least two solutions, described below with respect to FIGS. 10A, 10B, 11 and 12. A first solution (described with reference to FIG. 11) can comprise adding a DTC code into a phase modulator (which provides edge delay adjustment as described later herein) of a digital transmitter chain. A further solution (described with reference to FIGS. 12A and 12B) can include providing a complex phase-correction in the base-band. Such solution will be applicable in both digital (DTx, FIG. 12A) and an analog transmitter RF chain (ATX, FIG. 12B). The communication systems, devices, and other components in which RH synchronization is conducted are described in more detail with respect to FIG. 1-9.

An integrated Radio-Frequency frontend module (FEM) is broadly used in the frontend circuits for cellular handsets or other wireless devices. FIG. 1 illustrates an exemplary user device according to some aspects. The user device 100 may be a mobile device in some aspects and includes an application processor 105, base-band processor 110 (also referred to as a base-band sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165, and smart battery 170.

In some aspects, application processor 105 may include, for example, one or more central processing unit (CPU) cores and one or more of cache memory, low drop-out voltage regulators (LDOs), interrupt controllers, serial interfaces such as serial peripheral interface (SPI), inter-integrated circuit (I2C) or universal programmable serial interface sub-system, real time clock (RTC), timer-counters including interval and watchdog timers, general purpose IO, memory card controllers such as SD/MMC or similar, USB interfaces, mobile industry processor interface (MIPI) interfaces, and/or Joint Test Access Group (JTAG) test access ports.

In some aspects, base-band processor 110 may be implemented, for example, as a solder-down substrate including one or more integrated circuits, a single packaged integrated circuit soldered to a main circuit board, and/or a multi-chip module including two or more integrated circuits.

Applications of mmWave technology can include, for example, WiGig and future 5G, but the mmWave technology can be applicable to a variety of telecommunications systems. The mmWave technology can be especially attractive for short-range telecommunications systems. WiGig devices operate in the unlicensed 60 GHz band, whereas 5G mmWave is expected to operate initially in the licensed 28 GHz and 39 GHz bands. A block diagram of an example base-band processor 110 and RFEM 115 in a mmWave system is shown in FIG. 1A.

Figure 1A:
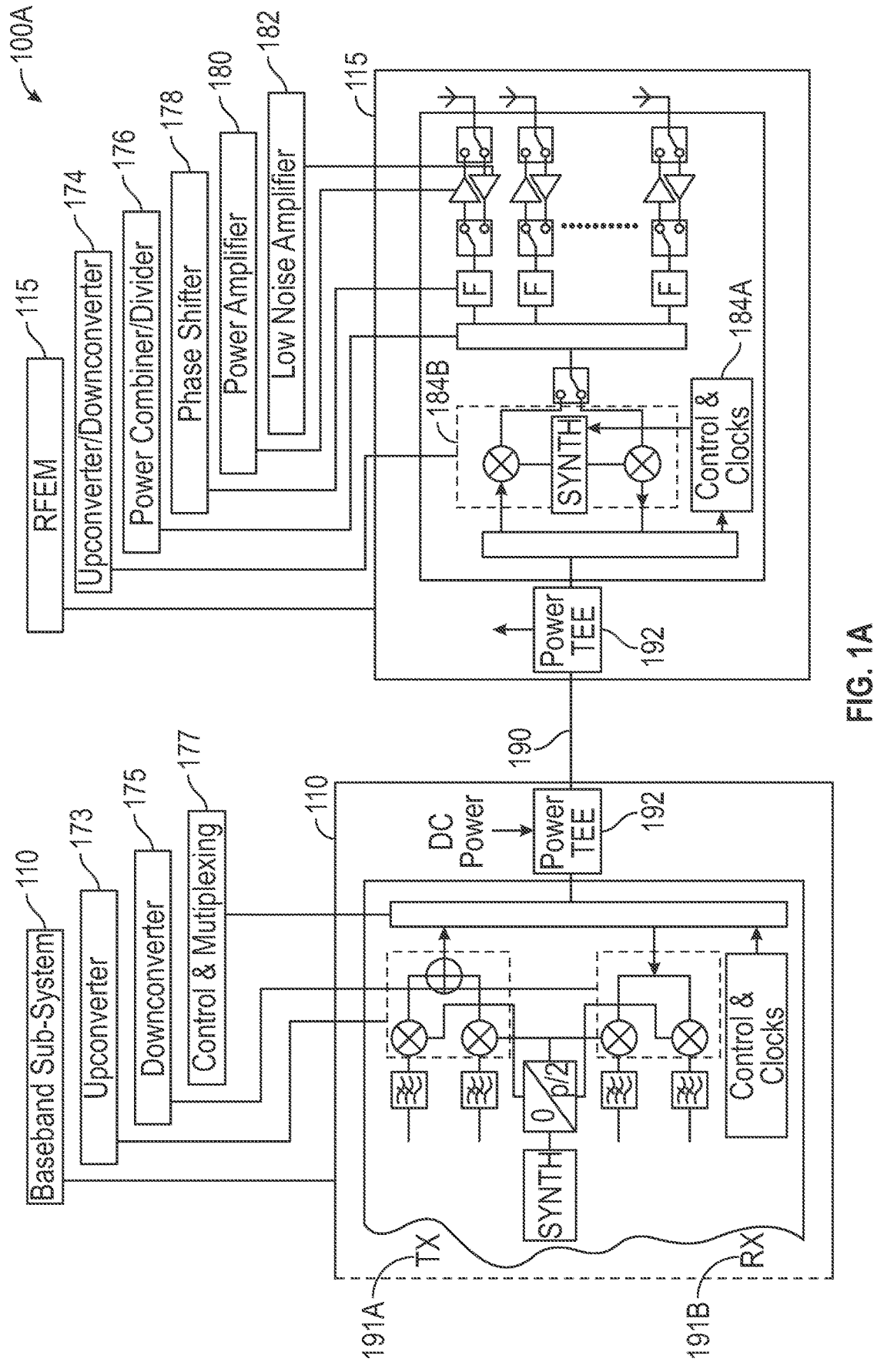
FIG. 1A illustrates a mmWave system, which can be used in connection with the device of FIG. 1 according to some aspects.

FIG. 1A illustrates a mmWave system 100A, which can be used in connection with the device 100 of FIG. 1 according to some aspects of the present disclosure. The system 100A includes two components: a base-band processor 110 and one or more radio front end modules (RFEMs) 115. The RFEM 115 can be connected to the base-band processor 110 by a single coaxial cable 190, which supplies a modulated intermediate frequency (IF) signal, DC power, clocking signals and control signals.

The base-band processor 110 is not shown in its entirety, but FIG. 1A rather shows an implementation of analog front end. This includes a transmitter (TX) section 191A with an upconverter 173 to intermediate frequency (IF) (around 10 GHz in current implementations), a receiver (RX) section 191B with downconversion 175 from IF to base-band, control and multiplexing circuitry 177 including a combiner to multiplex/demultiplex transmit and receive signals onto a single cable 190. In addition, power tee circuitry 192 (which includes discrete components) is included on the base-band circuit board to provide DC power for the RFEM 115. In some aspects, the combination of the TX section and RX section may be referred to as a transceiver, to which may be coupled one or more antennas or antenna arrays of the types described herein.

The RFEM 115 can be a small circuit board including a number of printed antennas and one or more RF devices containing multiple radio chains, including upconversion/downconversion 174 to millimeter wave frequencies, power combiner/divider 176, programmable phase shifting 178 and power amplifiers (PA) 180, low noise amplifiers (LNA) 182, as well as control and power management circuitry 184A and 184B. This arrangement can be different from Wi-Fi or cellular implementations, which generally have all RF and base-band functionality integrated into a single unit and only antennas connected remotely via coaxial cables.

This architectural difference can be driven by the very large power losses in coaxial cables at millimeter wave frequencies. These power losses can reduce the transmit power at the antenna and reduce receive sensitivity. In order to avoid this issue, in some aspects, PAs 180 and LNAs 182 may be moved to the RFEM 115 with integrated antennas. In addition, the RFEM 115 may include upconversion/downconversion 174 so that the IF signals over the coaxial cable 190 can be at a lower frequency. Additional system context for mmWave 5G apparatuses, techniques and features is discussed herein below.

Figures 2, 3A:
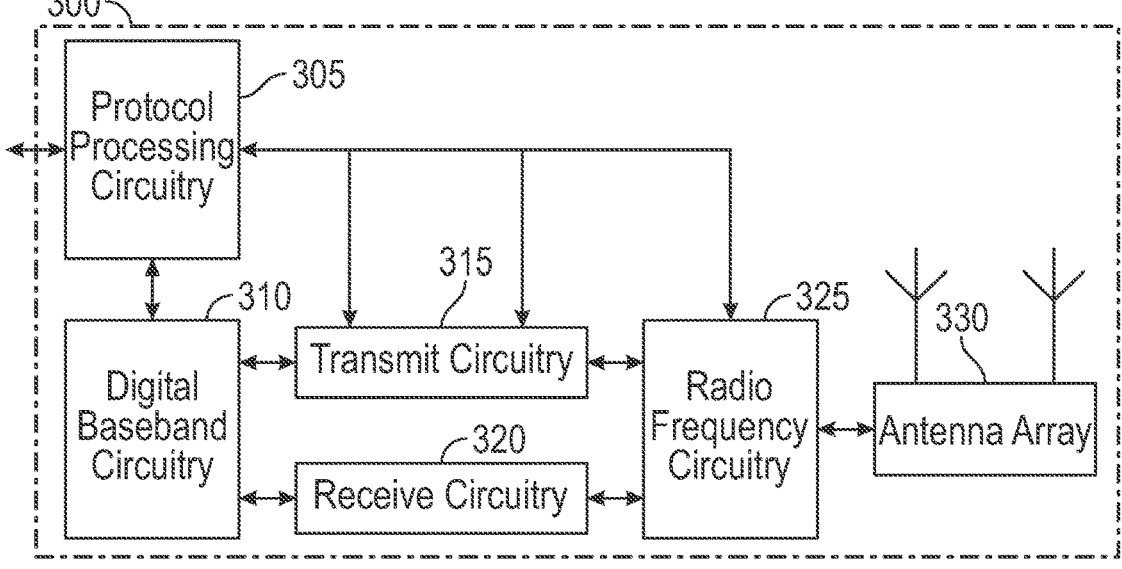
FIG. 2 illustrates an exemplary base station radio-head (RH) according to some aspects.
FIG. 3A illustrates exemplary wireless communication circuitry according to some aspects.

FIG. 2 illustrates an exemplary base station or infrastructure equipment radio head according to some aspects. The base station radio-head 200 may include one or more of application processor 205, base-band processors 210, one or more radio front end modules 215, memory 220, power management integrated circuitry (PMIC) 225, power tee circuitry 230, network controller 235, network interface connector 240, satellite navigation receiver (e.g., GPS receiver) 245, and user interface 250.

In some aspects, application processor 205 may include one or more CPU cores and one or more of cache memory, low drop-out voltage regulators (LDOs), interrupt controllers, serial interfaces such as SPI, I2C or universal programmable serial interface, real time clock (RTC), timer-counters including interval and watchdog timers, general purpose TO, memory card controllers such as SD/MMC or similar, USB interfaces, MIPI interfaces and Joint Test Access Group (JTAG) test access ports.

In some aspects, base-band processor 210 may be implemented, for example, as a solder-down substrate including one or more integrated circuits, a single packaged integrated circuit soldered to a main circuit board or a multi-chip sub-system including two or more integrated circuits.

In some aspects, memory 220 may include one or more of volatile memory including dynamic random access memory (DRAM) and/or synchronous DRAM (SDRAM), and non-volatile memory (NVM) including high-speed electrically erasable memory (commonly referred to as Flash memory), phase-change random access memory (PRAM), magnetoresistive random access memory (MRAM), and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable. Power tee circuitry 230 may provide both power supply and data connectivity to the base station radio-head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsion-naya Sputnikovaya Sistema (GLONASS), Galileo and/or BeiDou. The receiver 245 may provide, to application processor 205, data which may include one or more of position data or time data. Time data may be used by application processor 205 to synchronize operations with other radio base stations or infrastructure equipment.

In some aspects, user interface 250 may include one or more of buttons. The buttons may include a reset button. User interface 250 may also include one or more indicators such as LEDs and a display screen. As briefly mentioned earlier herein, systems can include multiple RHs similar to that shown in FIG. 2, and further description of other components of a RH and a system incorporating a RH are described with reference to FIG. 11 and FIG. 12 below.

Figure 3B:
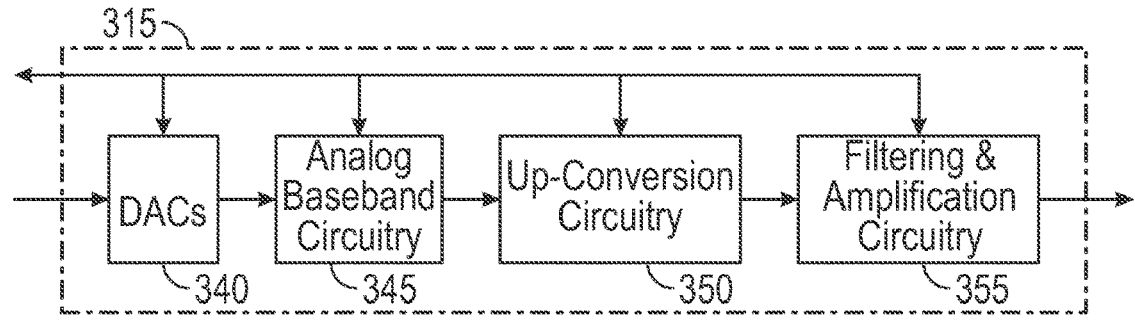
FIG. 3B illustrates aspects of exemplary transmit circuitry illustrated in FIG. 3A according to some aspects.
Figure 3C:
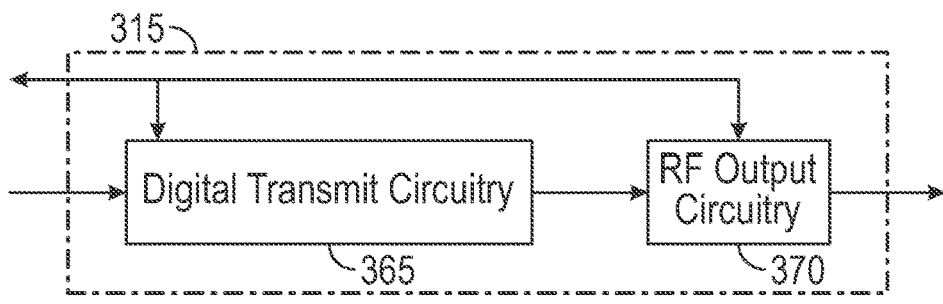
FIG. 3C illustrates aspects of exemplary transmit circuitry illustrated in FIG. 3A according to some aspects.
Figure 3D:
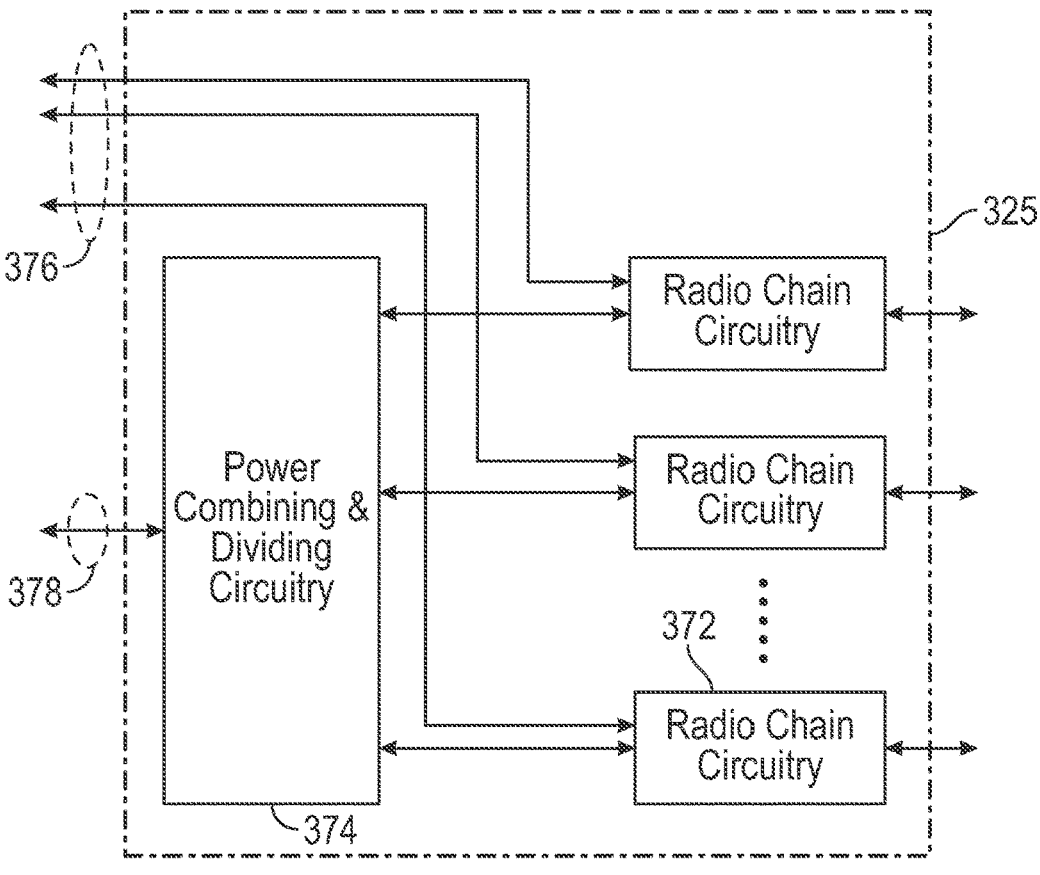
FIG. 3D illustrates aspects of exemplary radio frequency circuitry illustrated in FIG. 3A according to some aspects.
Figure 3E:
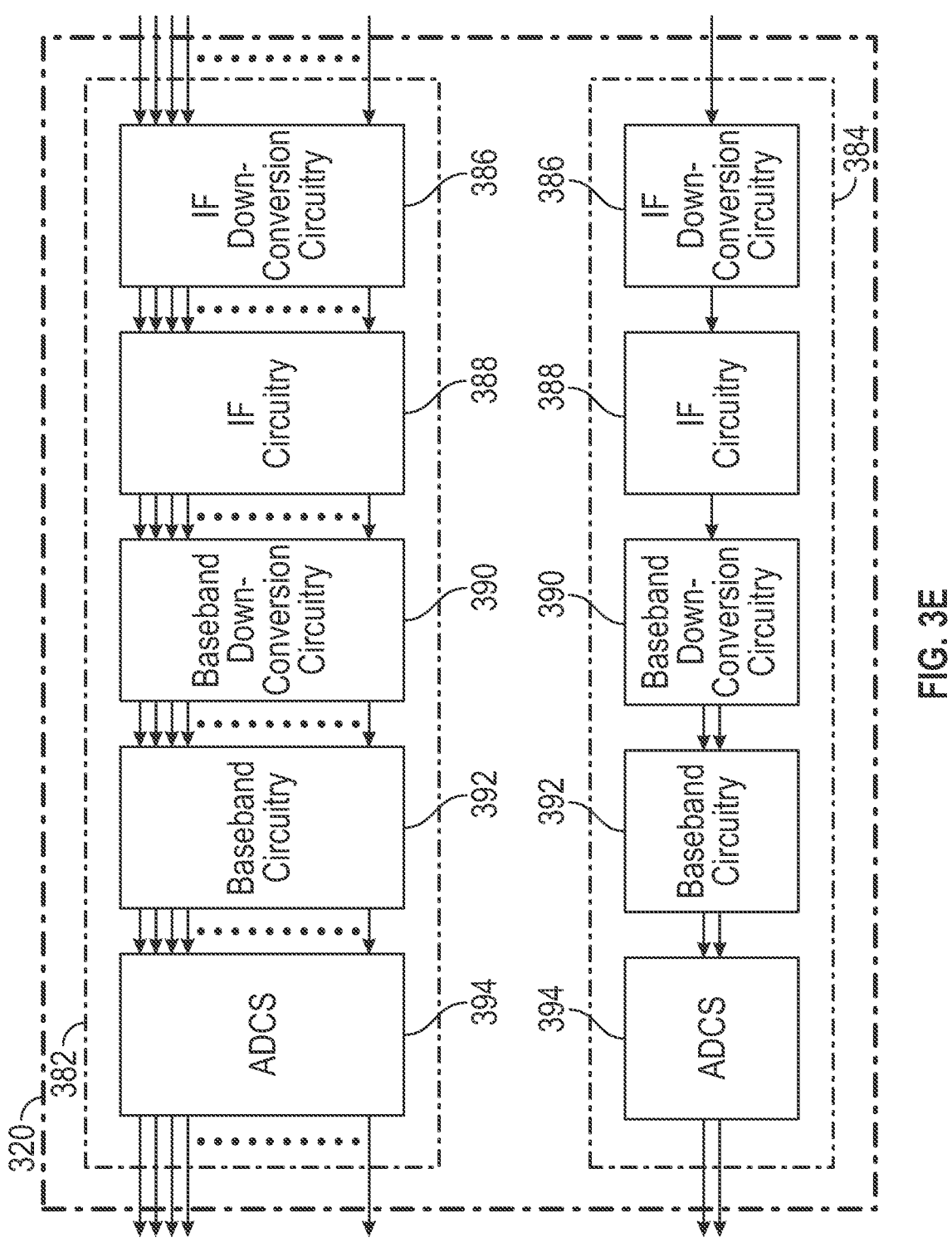
FIG. 3E illustrates aspects of exemplary receive circuitry in FIG. 3A according to some aspects.

FIG. 3A illustrates exemplary wireless communication circuitry according to some aspects; FIGS. 3B and 3C illustrate aspects of transmit circuitry shown in FIG. 3A according to some aspects; FIG. 3D illustrates aspects of radio frequency circuitry shown in FIG. 3A according to some aspects; FIG. 3E illustrates aspects of receive circuitry in FIG. 3A according to some aspects. Wireless communication circuitry 300 shown in FIG. 3A may be alternatively grouped according to functions. Components illustrated in FIG. 3A are provided here for illustrative purposes and may include other components not shown in FIG. 3A.

Wireless communication circuitry 300 may include protocol processing circuitry 305 (or processor) or other means for processing. Protocol processing circuitry 305 may implement one or more of medium access control (MAC), radio link control (RLC), packet data convergence protocol (PDCP), radio resource control (RRC) and non-access stratum (NAS) functions, among others. Protocol processing circuitry 305 may include one or more processing cores to execute instructions and one or more memory structures to store program and data information.

Wireless communication circuitry 300 may further include digital base-band circuitry 310. Digital base-band circuitry 310 may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Wireless communication circuitry 300 may further include transmit circuitry 315, receive circuitry 320 and/or antenna array circuitry 330. Wireless communication circuitry 300 may further include RF circuitry 325. In some aspects, RF circuitry 325 may include one or multiple parallel RF chains for transmission and/or reception. Each of the RF chains may be connected to one or more antennas of antenna array circuitry 330.

In some aspects, protocol processing circuitry 305 may include one or more instances of control circuitry. The control circuitry may provide control functions for one or more of digital base-band circuitry 310, transmit circuitry 315, receive circuitry 320, and/or RF circuitry 325.

FIGS. 3B and 3C illustrate aspects of transmit circuitry shown in FIG. 3A according to some aspects. Transmit circuitry 315 shown in FIG. 3B may include one or more of digital to analog converters (DACs) 340, analog base-band circuitry 345, up-conversion circuitry 350 and/or filtering and amplification circuitry 355. DACs 340 may convert digital signals into analog signals. Analog base-band circuitry 345 may perform multiple functions as indicated below. Up-conversion circuitry 350 may up-convert base-band signals from analog base-band circuitry 345 to RF frequencies (e.g., mmWave frequencies). Filtering and amplification circuitry 355 may filter and amplify analog signals. Control signals may be supplied between protocol processing circuitry 305 and one or more of DACs 340, analog base-band circuitry 345, up-conversion circuitry 350 and/or filtering and amplification circuitry 355.

Transmit circuitry 315 shown in FIG. 3C may include digital transmit circuitry 365 and RF circuitry 370. In some aspects, signals from filtering and amplification circuitry 355 may be provided to digital transmit circuitry 365. As above, control signals may be supplied between protocol processing circuitry 305 and one or more of digital transmit circuitry 365 and RF circuitry 370.

FIG. 3D illustrates aspects of radio frequency circuitry shown in FIG. 3A according to some aspects. Radio frequency circuitry 325 may include one or more instances of radio chain circuitry 372, which in some aspects may include one or more filters, power amplifiers, low noise amplifiers, programmable phase shifters and power supplies.

Radio frequency circuitry 325 may also in some aspects include power combining and dividing circuitry 374. In some aspects, power combining and dividing circuitry 374 may operate bidirectionally, such that the same physical circuitry may be configured to operate as a power divider when the device is transmitting, and as a power combiner when the device is receiving. In some aspects, power combining and dividing circuitry 374 may include one or more wholly or partially separate circuitries to perform power dividing when the device is transmitting and power combining when the device is receiving. In some aspects, power combining and dividing circuitry 374 may include passive circuitry including one or more two-way power divider/combiners arranged in a tree. In some aspects, power combining and dividing circuitry 374 may include active circuitry including amplifier circuits.

In some aspects, radio frequency circuitry 325 may connect to transmit circuitry 315 and receive circuitry 320 in FIG. 3A. Radio frequency circuitry 325 may connect to transmit circuitry 315 and receive circuitry 320 via one or more radio chain interfaces 376 and/or a combined radio chain interface 378. In some aspects, one or more radio chain interfaces 376 may provide one or more interfaces to one or more receive or transmit signals, each associated with a single antenna structure. In some aspects, the combined radio chain interface 378 may provide a single interface to one or more receive or transmit signals, each associated with a group of antenna structures.

FIG. 3E illustrates aspects of receive circuitry in FIG. 3A according to some aspects. Receive circuitry 320 may include one or more of parallel receive circuitry 382 and/or one or more of combined receive circuitry 384. In some aspects, the one or more parallel receive circuitry 382 and one or more combined receive circuitry 384 may include one or more Intermediate Frequency (IF) down-conversion circuitry 386, IF processing circuitry 388, base-band down-conversion circuitry 390, base-band processing circuitry 392 and analog-to-digital converter (ADC) circuitry 394. As used herein, the term "intermediate frequency" refers to a frequency to which a carrier frequency (or a frequency signal) is shifted as in intermediate step in transmission, reception, and/or signal processing. IF down-conversion circuitry 386 may convert received RF signals to IF. IF processing circuitry 388 may process the IF signals, e.g., via filtering and amplification. Base-band down-conversion circuitry 390 may convert the signals from IF processing circuitry 388 to base-band. Base-band processing circuitry 392 may process the base-band signals, e.g., via filtering and amplification. ADC circuitry 394 may convert the processed analog base-band signals to digital signals.

FIG. 4 illustrates exemplary RF circuitry of FIG. 3A according to some aspects. In an aspect, RF circuitry 325 in FIG. 3A (depicted in FIG. 4 using reference number 425) may include one or more of the IF interface circuitry 405, filtering circuitry 410, up-conversion and down-conversion circuitry 415, synthesizer circuitry 420, filtering and amplification circuitry 424, power combining and dividing circuitry 430, and radio chain circuitry 435.

FIG. 5A and FIG. 5B illustrate aspects of a radio front-end module (RFEM) useable in the circuitry shown in FIG. 1 and FIG. 2, according to some aspects. FIG. 5A illustrates an aspect of a RFEM according to some aspects. RFEM 500 incorporates a millimeter wave RFEM and one or more above-six gigahertz radio frequency integrated circuits (RFIC) 515 and/or one or more sub-six gigahertz RFICs (not shown in FIG. 5A). In this aspect, the one or more sub-six gigahertz RFICs 515 and/or one or more sub-six gigahertz RFICs may be physically separated from millimeter wave RFEM. RFICs 515 may include connection to one or more antennas 520. RFEM may include multiple antennas 510.

FIG. 5B illustrates an alternate aspect of a radio front end module 525, according to some aspects. In this aspect both millimeter wave and sub-six gigahertz radio functions may be implemented in the same physical radio front end module (RFEM) 530. RFEM 530 may incorporate both millimeter wave antennas 535 and sub-six gigahertz antennas 540.

Figure 6:
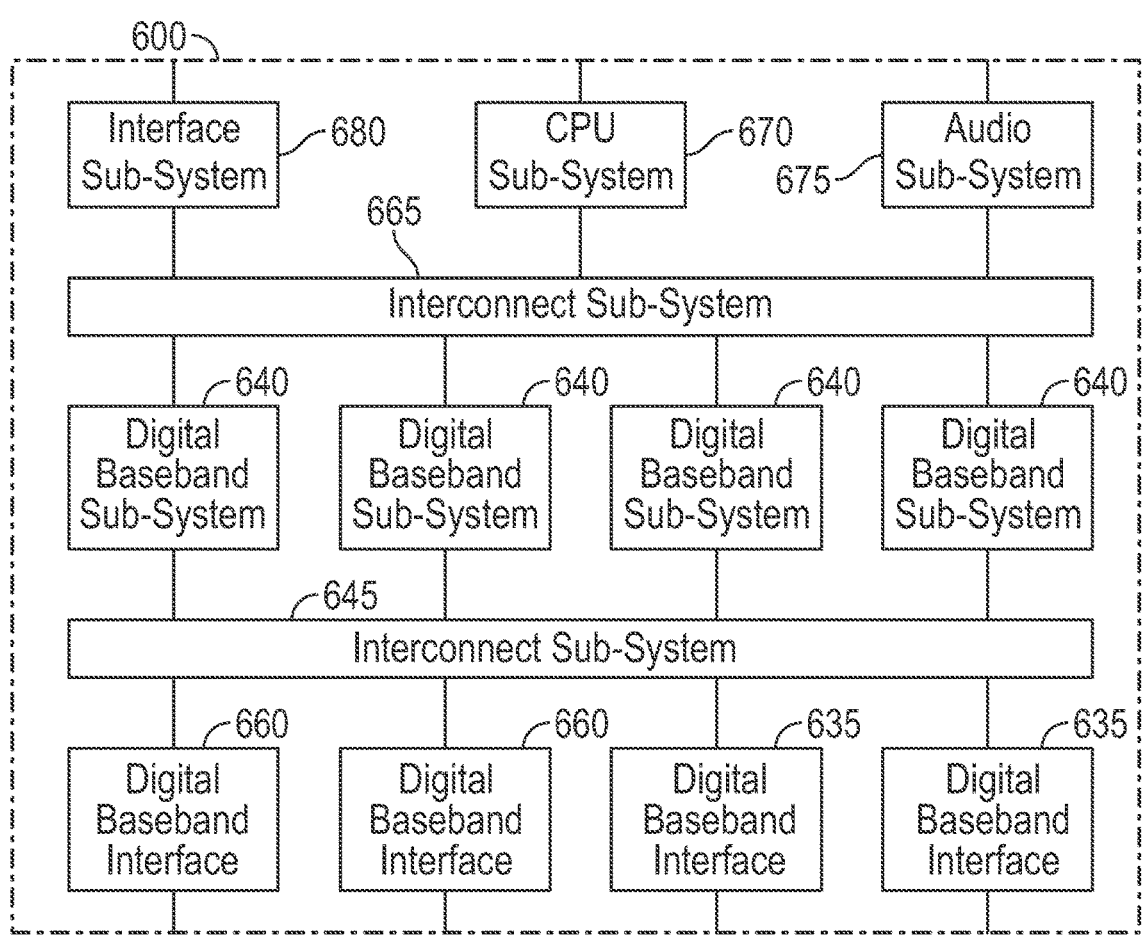
FIG. 6 illustrates an exemplary multi-protocol base-band processor useable in FIG. 1 or FIG. 2, according to some aspects.

FIG. 6 illustrates a multi-protocol base-band processor 600 useable in the system and circuitry shown in FIG. 1 or FIG. 2, according to some aspects. In an aspect, base-band processor may contain one or more digital base-band subsystems 640, also herein referred to collectively as digital base-band subsystems 640.

In an aspect, the one or more digital base-band subsystems 640 may be coupled via interconnect subsystem 665 to one or more of CPU subsystem 670, audio subsystem 675 and interface subsystem 680. In an aspect, the one or more digital base-band subsystems 640 may be coupled via interconnect subsystem 645 to one or more of each of digital base-band interface 660 and mixed-signal base-band subsystem 635.

In an aspect, interconnect subsystem 665 and 645 may each include one or more of each of buses point-to-point connections and network-on-chip (NOC) structures. In an aspect, audio subsystem 675 may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters.

Figure 7:
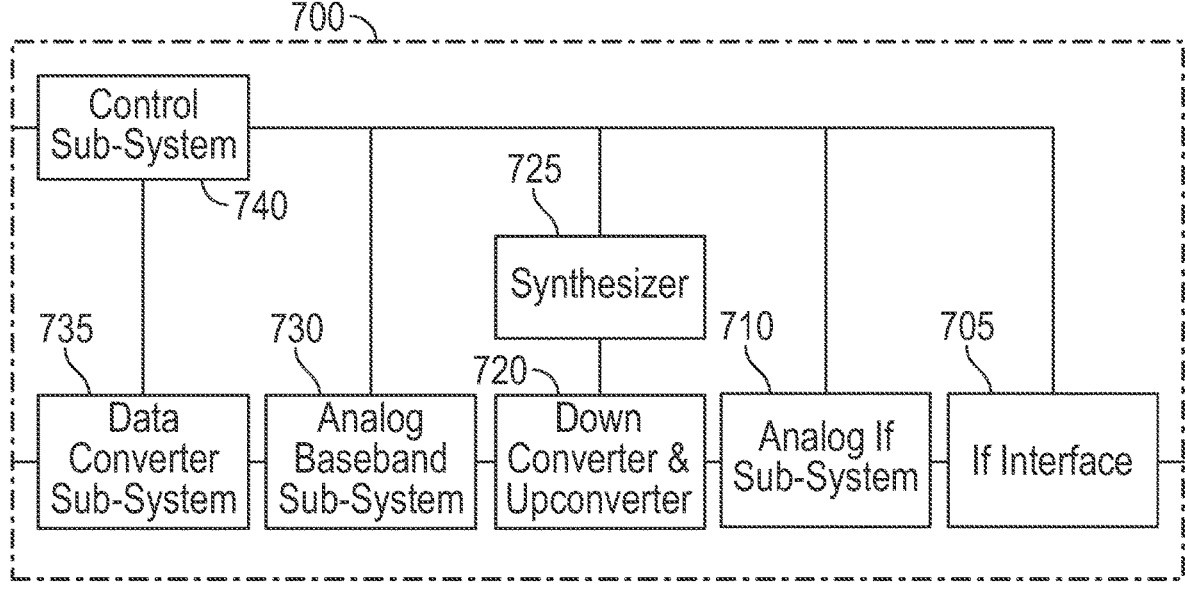
FIG. 7 illustrates an exemplary mixed signal base-band subsystem, according to some aspects.

FIG. 7 illustrates an exemplary of a mixed signal base-band subsystem 700, according to some aspects. In an aspect, mixed signal base-band subsystem 700 may include one or more of IF interface 705, analog IF subsystem 710, down-converter and up-converter subsystem 720, analog base-band subsystem 730, data converter subsystem 735, synthesizer 725 and control subsystem 740.

Figure 8A:
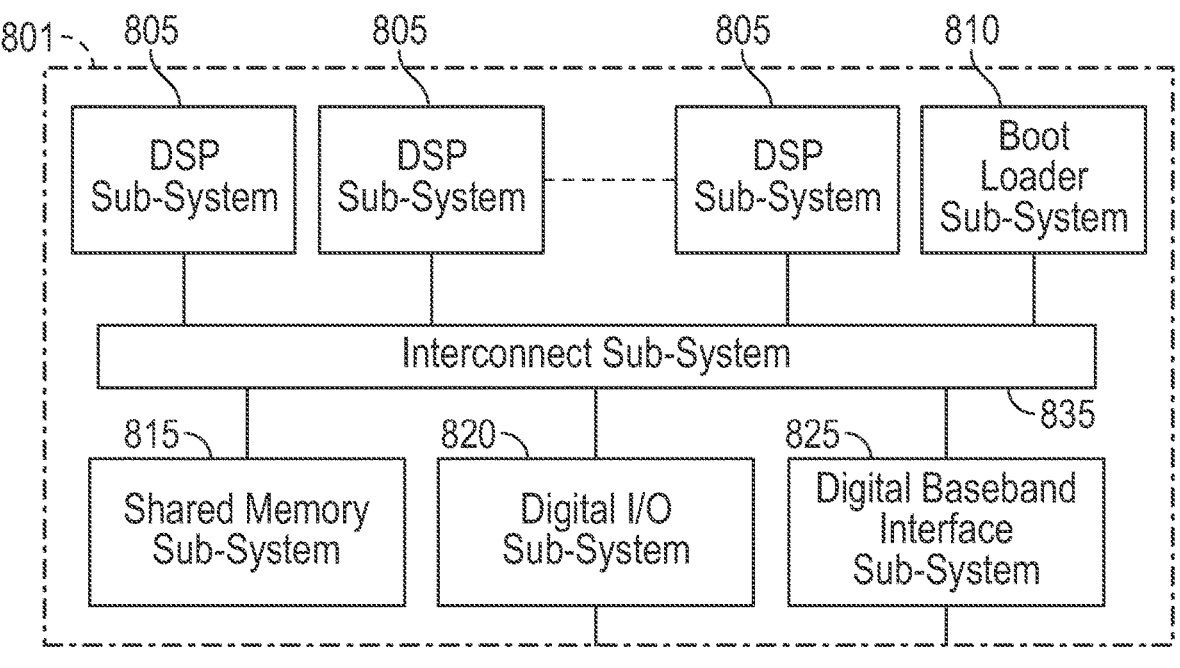
FIG. 8A illustrates an exemplary digital base-band subsystem, according to some aspects.
Figure 8B:
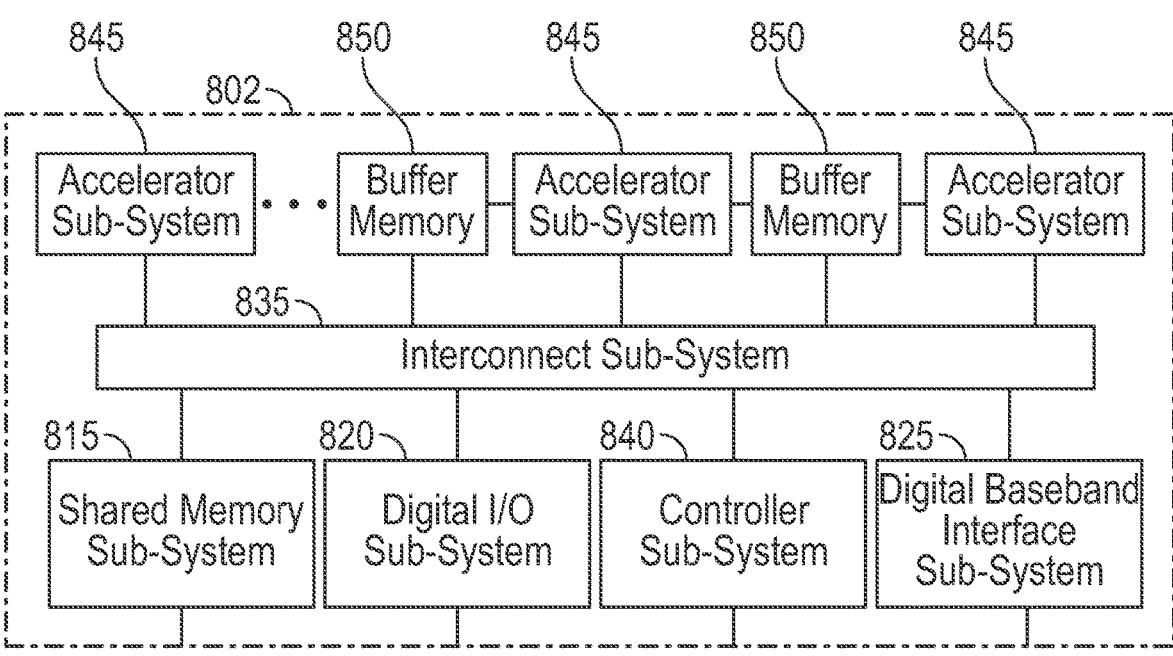
FIG. 8B illustrates an alternate aspect of an exemplary base-band processing subsystem, according to some aspects.

FIG. 8A illustrates a digital base-band processing subsystem 801, according to some aspects. FIG. 8B illustrates an alternate aspect of a digital base-band processing subsystem 802, according to some aspects.

In an aspect of FIG. 8A, the digital base-band processing subsystem 801 may include one or more of each of digital signal processor (DSP) subsystems 805, interconnect subsystem 835, boot loader subsystem 810, shared memory subsystem 815, digital I/O subsystem 820, and digital base-band interface subsystem 825.

In an aspect of FIG. 8B, digital base-band processing subsystem 802 may include one or more of each of accelerator subsystem 845, buffer memory 850, interconnect subsystem 835, shared memory subsystem 815, digital I/O subsystem 820, controller subsystem 840 and digital base-band interface subsystem 825.

In an aspect, boot loader subsystem 810 may include digital logic circuitry configured to perform configuration of the program memory and running state associated with each of the one or more DSP subsystems 805. Configuration of the program memory of each of the one or more DSP subsystems 805 may include loading executable program code from storage external to digital base-band processing subsystems 801 and 802. Configuration of the running state associated with each of the one or more DSP subsystems 805 may include one or more of the steps of: setting the state of at least one DSP core which may be incorporated into each of the one or more DSP subsystems 805 to a state in which it is not running, and setting the state of at least one DSP core which may be incorporated into each of the one or more DSP subsystems 805 into a state in which it begins executing program code starting from a predefined memory location.

In an aspect, shared memory subsystem 815 may include one or more of read-only memory (ROM), static random access memory (SRAM), embedded dynamic random access memory (eDRAM) and/or non-volatile random access memory (NVRAM).

In an aspect, digital I/O subsystem 820 may include one or more of serial interfaces such as Inter-Integrated Circuit (I2C), Serial Peripheral Interface (SPI) or other 1, 2 or 3-wire serial interfaces, parallel interfaces such as general-purpose input-output (GPIO), register access interfaces and direct memory access (DMA). In an aspect, a register access interface implemented in digital I/O subsystem 820 may permit a microprocessor core external to digital base-band processing subsystem 801 to read and/or write one or more of control and data registers and memory. In an aspect, DMA logic circuitry implemented in digital I/O subsystem 820 may permit transfer of contiguous blocks of data between memory locations including memory locations internal and external to digital base-band processing subsystem 801.

In an aspect, digital base-band interface subsystem 825 may provide for the transfer of digital base-band samples between base-band processing subsystem and mixed signal base-band or radio-frequency circuitry external to digital base-band processing subsystem 801. In an aspect, digital base-band samples transferred by digital base-band interface subsystem 825 may include in-phase and quadrature (I/Q) samples.

In an aspect, controller subsystem 840 may include one or more of each of control and status registers and control state machines. In an aspect, control and status registers may be accessed via a register interface and may provide for one or more of: starting and stopping operation of control state machines, resetting control state machines to a default state, configuring optional processing features, and/or configuring the generation of interrupts and reporting the status of operations. In an aspect, each of the one or more control state machines may control the sequence of operation of each of the one or more accelerator subsystems 845. There may be examples of implementations of both FIG. 8A and FIG. 8B in the same base-band subsystem.

Figure 9:
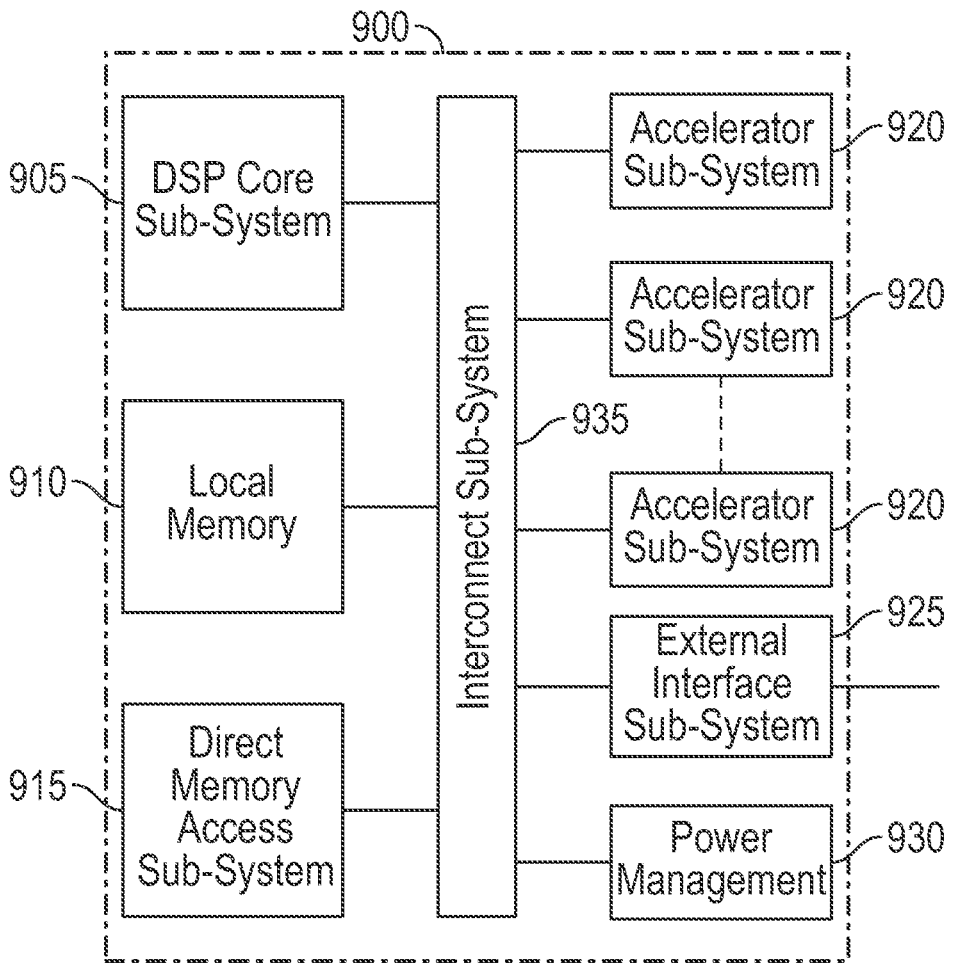
FIG. 9 illustrates an exemplary digital signal processor subsystem, according to some aspects.

FIG. 9 illustrates a digital signal processor (DSP) subsystem 900 according to some aspects. In an aspect, DSP subsystem 900 may include one or more of each of DSP core subsystem 905, local memory 910, direct memory access (DMA) subsystem 915, accelerator subsystem 920, external interface subsystem 925, power management circuitry 930 and interconnect subsystem 935.

In an aspect, the local memory 910 may include one or more of each of read-only memory, static random access memory or embedded dynamic random access memory.

In an aspect, the DMA subsystem 915 may provide registers and control state machine circuitry adapted to transfer blocks of data between memory locations including memory locations internal and external to DSP subsystem 900.

In an aspect, external interface subsystem 925 may provide for access by a microprocessor system external to DSP subsystem 900 to one or more of memory, control registers and status registers which may be implemented in DSP subsystem 900. In an aspect, external interface subsystem 925 may provide for transfer of data between local memory 910 and storage external to DSP subsystem 900 under the control of one or more of the DMA subsystem 915 and the DSP core subsystem 905.

Distributed Radio Feed-Forward Clock Synchronization

As described earlier herein, RHs can exhibit apparent phase drift, having catastrophic results in multiple antenna systems. Systems, methods and apparatuses according to some aspects can measure the relative phase between the unmodulated signals originating from the two synthesizers (located on each RH) using a Time-to-Digital Converted (TDC). Once the instantaneous phase discrepancy has been detected, the output of a secondary RH can be aligned to that of the primary RH. While two RHs are shown in the figures and described with reference to the figures, more than two RHs can be included in some embodiments. In some embodiments, one primary and theoretically infinite number of secondary RHs.

This disclosure brings forth two alternative methods of injecting the phase correction directly into the transmitted signal without changing either the XTL or the synthesizer (usually a PLL) output. Unlike a closed-loop correction in the XTL/PLL, this open feed-forward correction can be applied with high accuracy, with little latency and hence without risk of instability. The two alternative realizations we propose are Digital-to-Time Converter (DTC) phase-correction and base-band (BB) phase-correction.

Figure 10A:
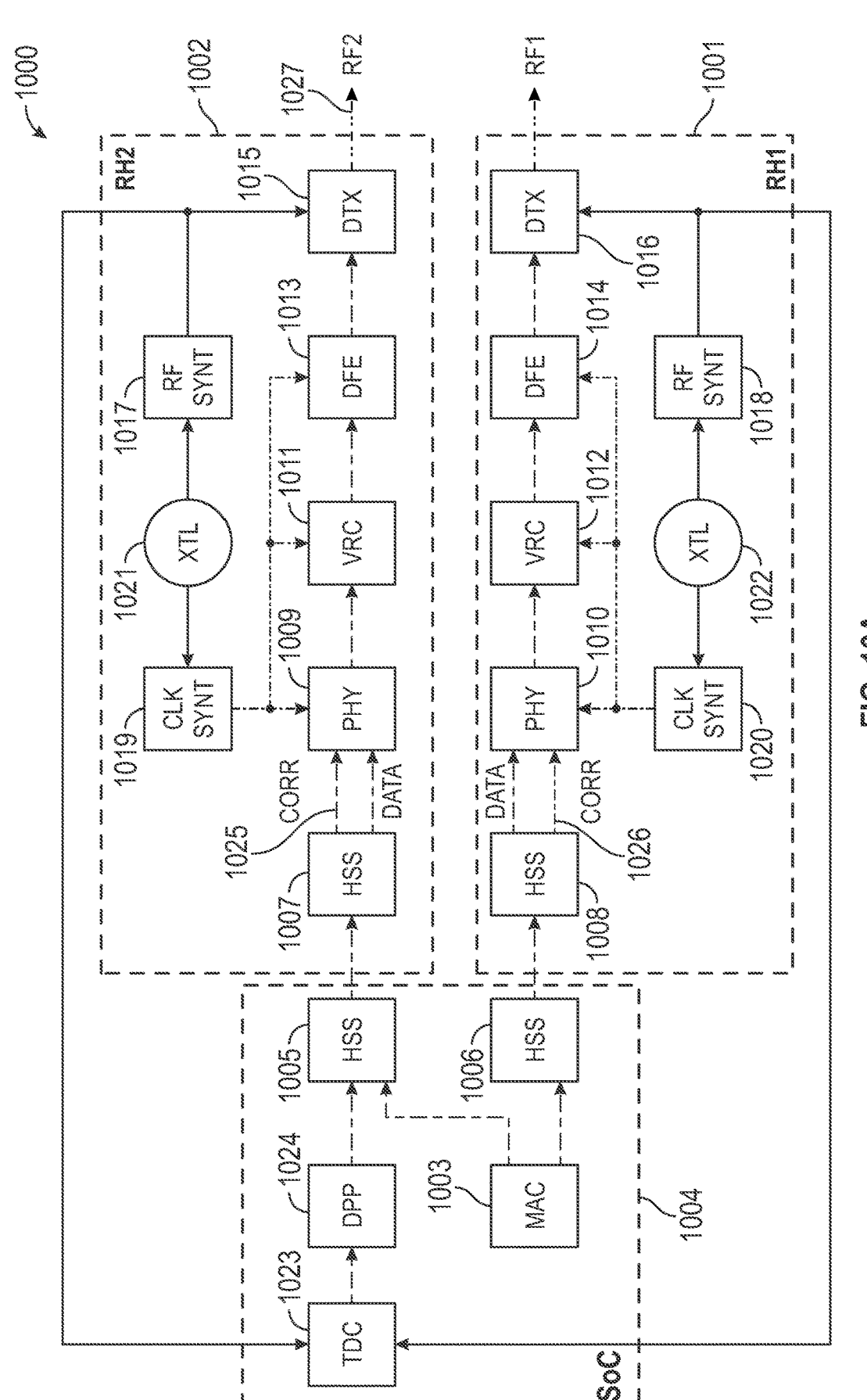
FIG. 10A illustrates a schematic drawing of a first system comprised of two RHs according to some aspects.
Figure 10B:
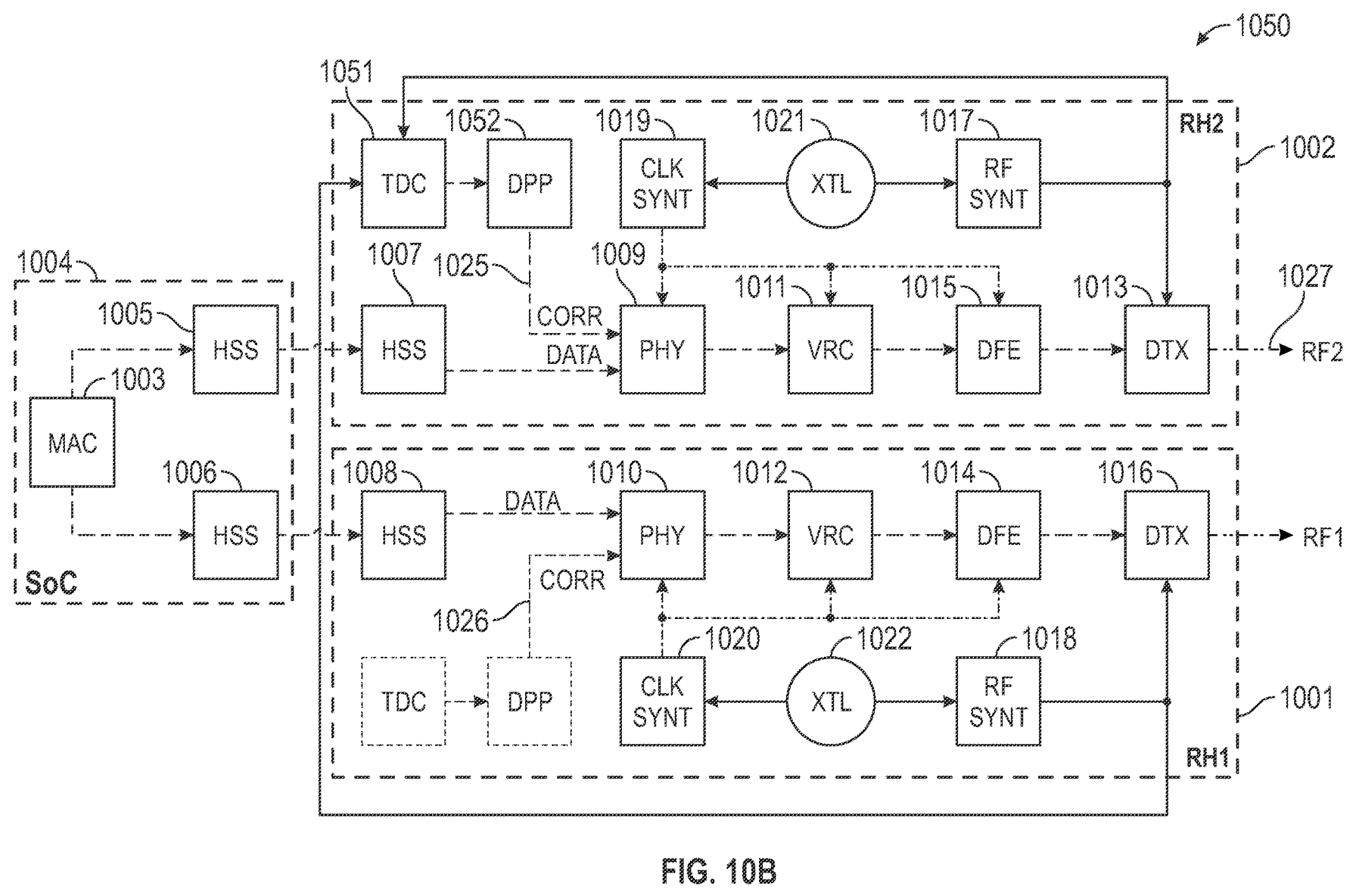

FIG. 10A illustrates a schematic drawing of a first system 1000 comprised of two RHs according to some aspects. FIG. 10B illustrates a schematic drawing of a second system 1050 comprised of two RHs with according to some aspects.

Referring to FIG. 10A, the system 1000 includes two RHs 1001, 1002. While two RHs 1001, 1002 are shown, a system 1000 can include more than two RHs or only one RH. Each RH 1001, 1002 gets a base-band data-stream from the MAC 1003 of a base-band sub-system (BBSS) 1004, which can connect to the individual RH 1001, 1002 via a high-speed serial interface (HSS) 1005, 1006. Each RH 1001, 1002 can include an HSS transceiver 1007, 1008. Each RH 1001, 1002 can further include a PHY modem 1009, 1010 to translate data received from the BBSS 1004 to data that can be transmitted. Each RH 1001, 1002 can further include a Variable Rate Converter (VRC) 1011, 1012, and Digital Front End (DFE) 1013, 1014. The DFE 1013, 1014 can include similar components as described earlier herein with respect to FIG. 1, FIG. 1A, FIG. 2, FIG. 5A and FIG. 5B.

Each RH 1001, 1002 can further include Digital Transmitter RF chain (DTx) 1015, 1016. Each DTx chain 1015, 1016 can include same or similar components as described earlier herein with respect to FIGS. 3A-3D. RHs 1001, 1002 can further include other components of RF circuitry similar to those shown above with respect to FIG. 4, including at least one RF carrier synthesizer (RF SYNT) 1017, 1018, system clock synthesizer (CLK SYNT) 1019, 1020, and reference quartz crystal-based oscillator (XTL) 1021, 1022. CLK SYNT 1019, 1020 can drive a digital clock for transmitting digital information internally. RF SYNT 1017, 1018 can be used as a carrier for transmitting RF signals to the outside world (e.g., over air interfaces RF1, RF2, etc.).

The frequency of the signal output by RF SYNT 1017, 1018 may not be the exact frequency needed for transmission. Any time-varying difference in the frequency produced by a XTL 1021, 1022 will be transformed into a time-varying difference between the two carrier (LO) frequencies at the RF SYNT 1017, 1018 output, and subsequently a time-varying phase drift will be generated between the two carrier frequencies. For reasons already described earlier herein, this phase drift will cause misalignment in transmit streams, leading to failure of multi-antenna transmission.

Therefore, in FIG. 10A, a TDC 1023 is added to the BBSS 1004 to measure the relative phase of the two LOs—they are transmitted over a specialized analog channel from each radio-head to the BBSS. The TDC 1023 can generate a digital representation of the instantaneous (sampled) phase discrepancy (henceforth, error). This error is then processed by the Digital Phase Processor (DPP) 1024 into a correction signal 1025, 1026 and transmitted digitally (on the HSS interface 1005, 1006) to the radio-head 1001, 1002 slated for phase correction (RH2 1002 in the example of FIG. 10A). Alternatively, in FIG. 10B, TDC 1051 in RH 1002 will generate this representation of the instantaneous phase error, based on the RF SYNT output from RH 1001 provided to the RH 1002. Again, while two RHs 1001, 1002 are shown, more or fewer than two RHs can be included.

Figure 11:
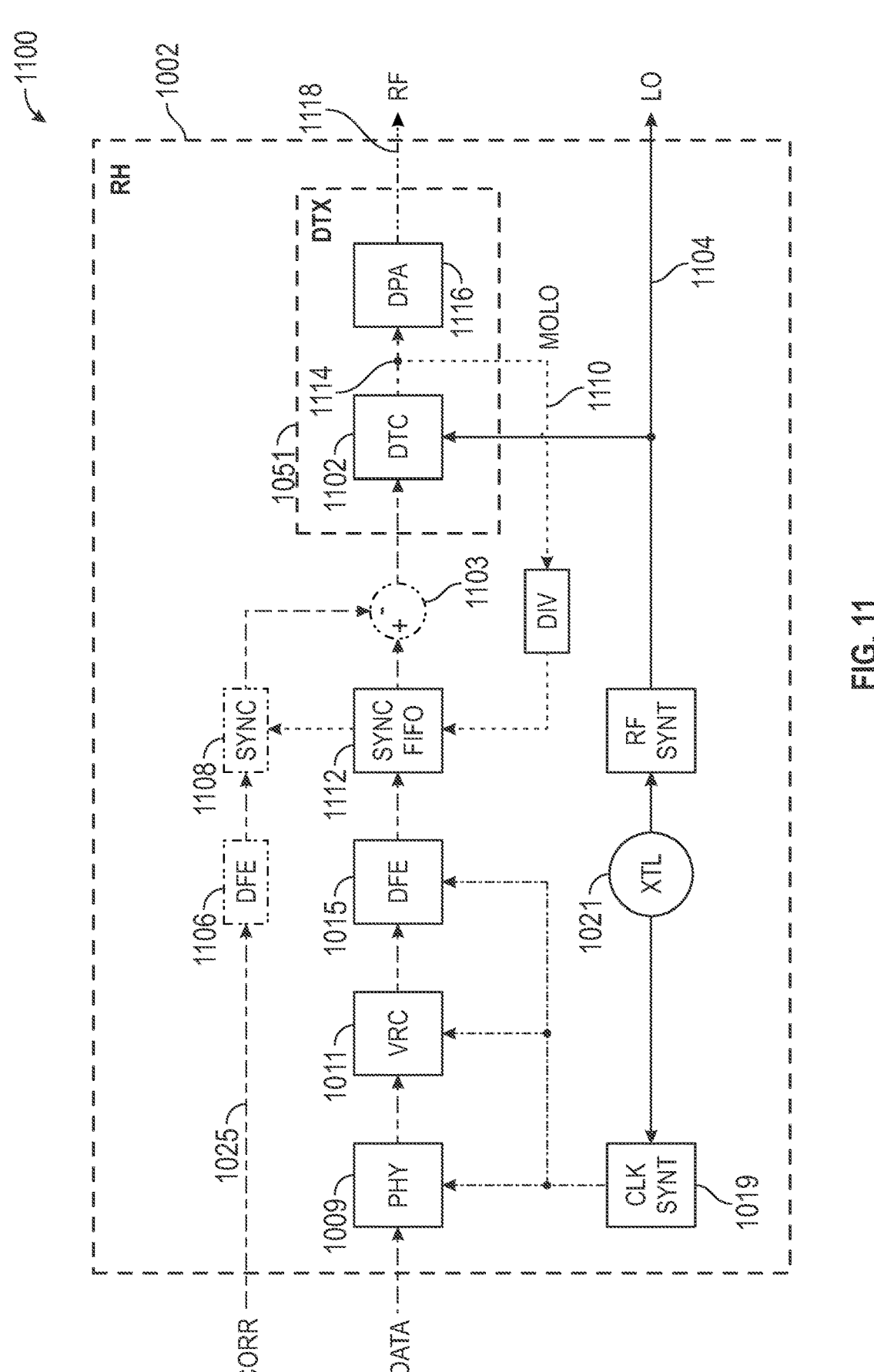
FIG. 11 illustrates a first system for phase correction according to some aspects.
Figures 12A, 12B:
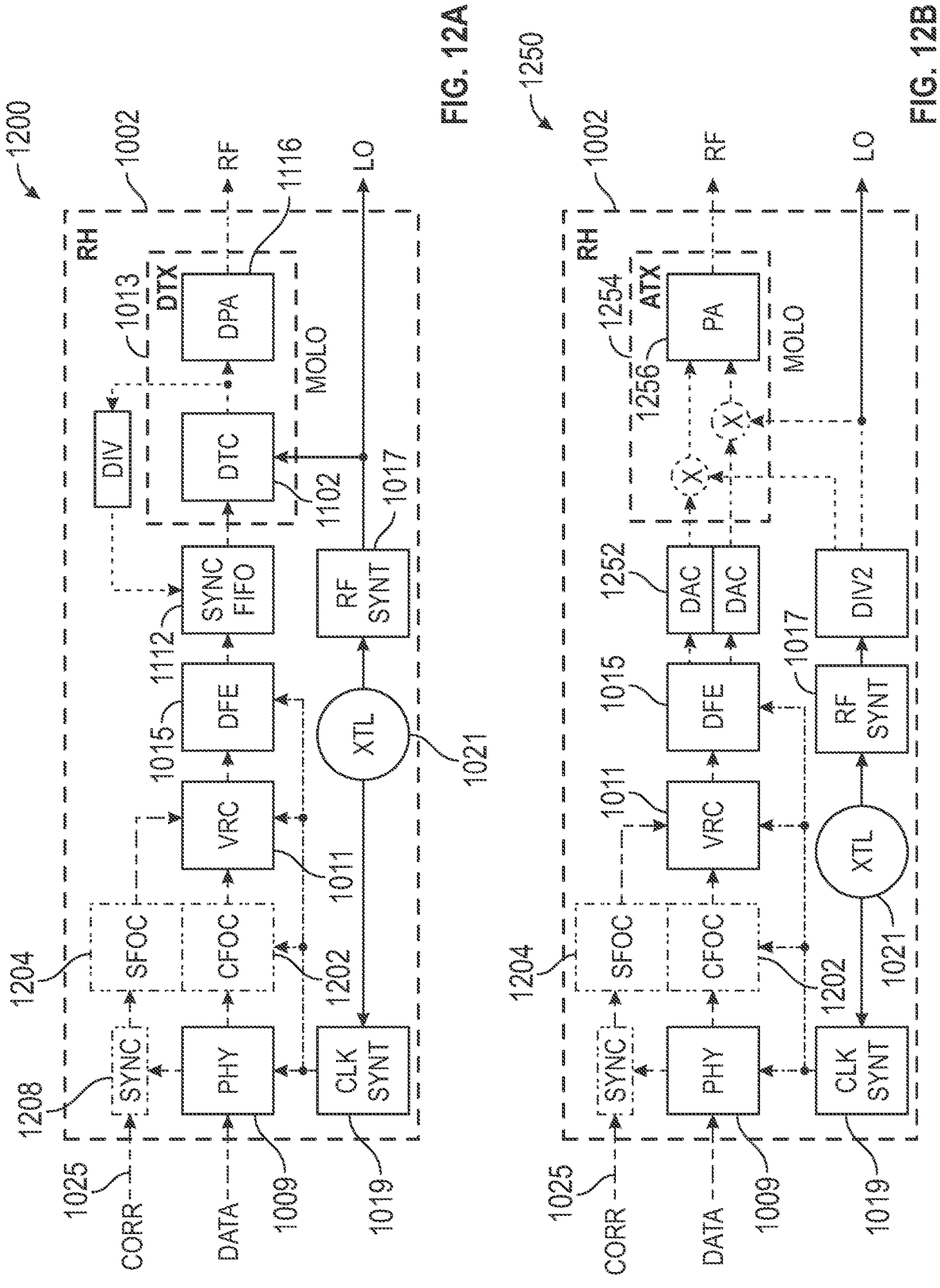
FIG. 12A illustrates a digital second system for phase correction according to some aspects.
FIG. 12B illustrates an analog second system for phase correction according to some aspects.

Aspects provide two distinct methods of injecting the phase correction 1025, 1026 into to RH 1002 (as shown in FIG. 10A, 10B) output 1027. FIG. 11 illustrates a first system 1100 for phase correction according to some aspects. FIGS. 12A and 12B illustrate a second (digital and analog) system for phase correction according to some aspects.

Referring to FIG. 11, correction can be injected using DTX circuitry 1051. A DTC 1102 inserts phase correction provided by adder 1103. From a system point-of-view, this is very natural and straightforward because the LO 1104 is corrected directly where it is used—in the DTC. The phase correction signal 1025 can be transferred from the BBSS 1004 through the HSS 1007 (FIG. 10A) or derived locally within RH 1002 (FIG. 10B). Then further signal processing and change of representation can be done in the DFE. This representation can include DTC codes (generated by the DFE 1106). Then, the correction is resampled to the modulated-LO (MOLO) clock 1110 and subtracted from the DTC codes at adder 1103 formed by the signal DFE. Synchronization FIFO buffer 1112, VRC 1111, and DFE 1015 can be clocked by clock synthesizer 1019.

As mentioned briefly earlier herein, information of the PHY 1009, VRC 1011, and DFE 1015 is clocked by the CLK SYNT 1019, at every cycle. The SYNC FIFO 1112 will on average have the same rate as input and the same rate and output, and the output is fed into adder 1103 and from there to DTX 1051. The DTC 1102 of the DTX 1051 takes a digital word and alters the phase of the input so that the signal 1114 includes phase information, making the DTC 1102 effectively a phase modulator. This phase modulation can take into account the phase discrepancy correction signal fed at adder 1103 and apply this correction directly to the output to be provided to digital power amplifier 1116 eventually transmitted at RF signal 1118.

FIGS. 12A and 12B illustrates a second system 1200 for phase correction according to some aspects. Blocks common to FIGS. 10A, 10B and 11 are similarly numbered and operate in a similar fashion as described above. Only differences in system 1200 are described with respect to FIGS. 12A and 12B.

In the second system 1200, phase correction is inserted into the base-band (BB) signal, but two types of correction are provided before the signal is transmitted between the MAC (not shown in FIG. 12A) and DTX. Carrier Frequency Offset Correction (CFOC) 1202 is done by converting the phase error to a complex exponent ($e^{-j\Phi_{err}(t)}$) and multiplying the BB signal by this phase error created in block 1202. Such a correction shall cause a shift in the center frequency that will cancel-out the LO frequency-error.

Sampling Frequency Offset Correction (SFOC) 1204: correcting only the CFO will leave an incorrect number of samples (for example: if the local frequency increases, more DTC codes are generated than required). Block 1204 helps correct for this inside VRC 1011. The VRC 1011 will resample the BB signal to the carrier frequency. This comprises a mathematical operation including, for example, interpolation to a desired sampling rate. If there is an LO frequency error, the VRC 1011 should resample to the actual LO frequency (i.e., including the frequency error) instead of the required carrier frequency.

FIG. 12B is similar to FIG. 12A but is in regards to analog rather than digital transmitters. System 1250 provides digital to analog converters 1252 before providing analog transmissions at block 1254, using power amplifier 1256.

Other Systems and Apparatuses

Figure 13:
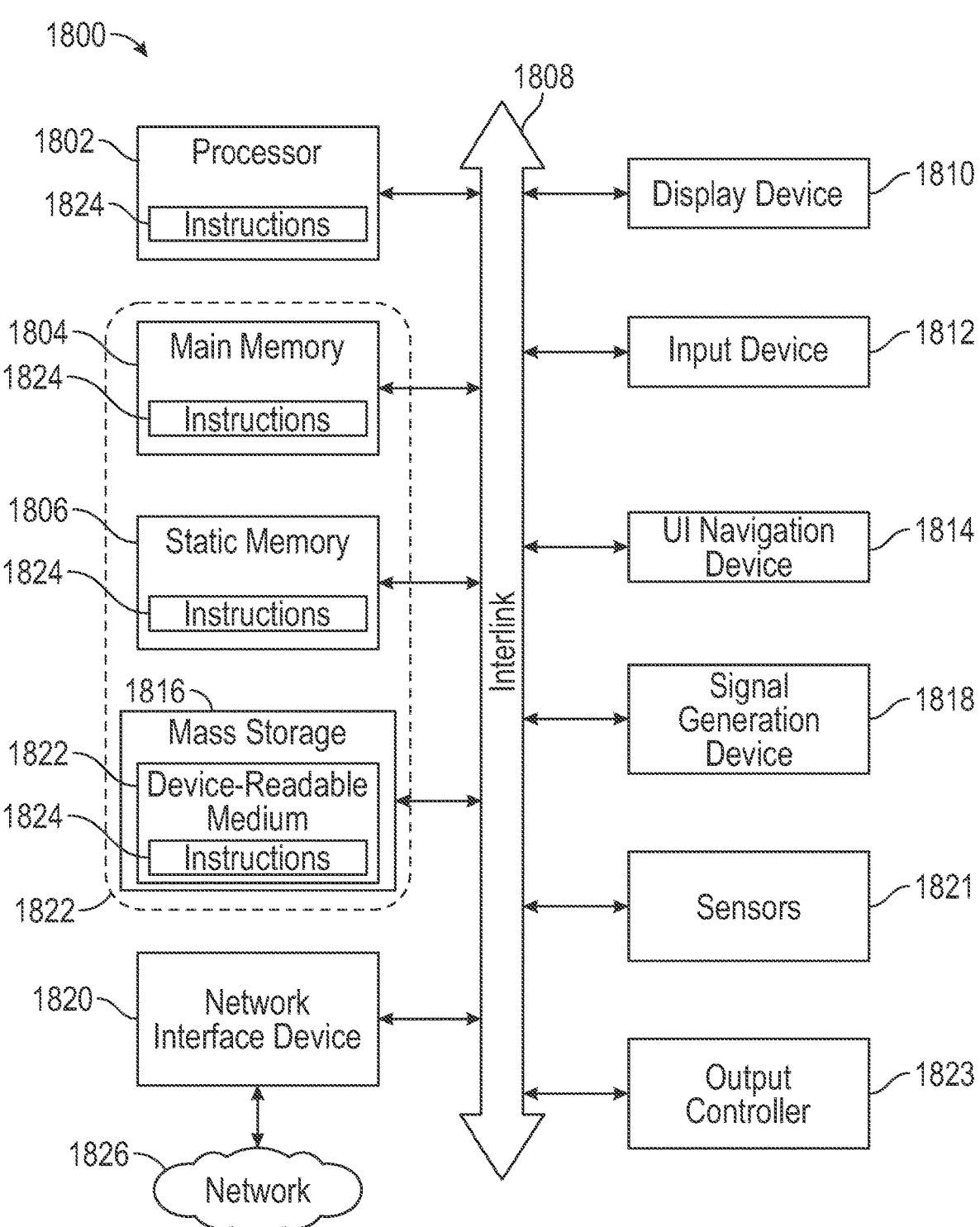
FIG. 13 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 13 illustrates a block diagram of a communication device 1800 such as an evolved Node-B (eNB), a new generation Node-B (gNB), an access point (AP), a wireless station (STA), a mobile station (MS), or a user equipment (UE), in accordance with some aspects. In alternative aspects, the communication device 1800 may operate as a standalone device or may be connected (e.g., networked) to other communication devices. In some aspects, the communication device 1800 can use one or more of the techniques and circuits discussed herein, in connection with any of FIG. 1-FIG. 12.

Circuitry (e.g., processing circuitry) is a collection of circuits implemented in tangible entities of the device 1800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1800 follow.

In some aspects, the device 1800 may operate as a standalone device or may be connected (e.g., networked) to other devices. In a networked deployment, the communication device 1800 may operate in the capacity of a server communication device, a client communication device, or both in server-client network environments. In an example, the communication device 1800 may act as a peer communication device in peer-to-peer (P2P) (or other distributed) network environment. The communication device 1800 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1800 may include a hardware processor 1802 (e.g., a central processing unit (CPU), a graphics processing unit (GPU), a hardware processor core, or any combination thereof), a main memory 1804, a static memory 1806, and mass storage 1816 (e.g., hard drive, tape drive, flash storage, or other block or storage devices), some or all of which may communicate with each other via an interlink (e.g., bus) 1808.

The communication device 1800 may further include a display unit 1810, an alphanumeric input device 1812 (e.g., a keyboard), and a user interface (UI) navigation device 1814 (e.g., a mouse). In an example, the display unit 1810, input device 1812 and UI navigation device 1814 may be a touch screen display. The communication device 1800 may additionally include a signal generation device 1818 (e.g., a speaker), a network interface device 1820, and one or more sensors 1821, such as a global positioning system (GPS) sensor, compass, accelerometer, or other sensor. The communication device 1800 may include an output controller 1823, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1816 may include a communication device-readable medium 1822, on which is stored one or more sets of data structures or instructions 1824 (e.g., software) embodying or utilized by any one or more of the techniques or functions described herein. In some aspects, registers of the processor 1802, the main memory 1804, the static memory 1806, and/or the mass storage 1816 may be, or include (completely or at least partially), the device-readable medium 1822, on which is stored the one or more sets of data structures or instructions 1824, embodying or utilized by any one or more of the techniques or functions described herein. In an example, one or any combination of the hardware processor 1802, the main memory 1804, the static memory 1806, or the mass storage 1816 may constitute the device-readable medium 1822.

As used herein, the term "device-readable medium" is interchangeable with "computer-readable medium" or "machine-readable medium". While the communication device-readable medium 1822 is illustrated as a single medium, the term "communication device-readable medium" may include a single medium or multiple media (e.g., a centralized or distributed database, and/or associated caches and servers) configured to store the one or more instructions 1824.

The term "communication device-readable medium" may include any medium that is capable of storing, encoding, or carrying instructions for execution by the communication device 1800 and that cause the communication device 1800 to perform any one or more of the techniques of the present disclosure, or that is capable of storing, encoding or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1824 may further be transmitted or received over a communications network 1826 using a transmission medium via the network interface device 1820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1820 may include one or more physical jacks (e.g., Ethernet, coaxial, or phone jacks) or one or more antennas to connect to the communications network 1826. In an example, the network interface device 1820 may include a plurality of antennas to wirelessly communicate using at least one of single-input multiple-output (SIMO), MIMO, or multiple-input single-output (MISO) techniques. In some examples, the network interface device 1820 may wirelessly communicate using Multiple User MIMO techniques.

The term "transmission medium" shall be taken to include any intangible medium that is capable of storing, encoding, or carrying instructions for execution by the communication device 1800, and includes digital or analog communications signals or other intangible medium to facilitate communication of such software. In this regard, a transmission medium in the context of this disclosure is a device-readable medium.

Figure 14:
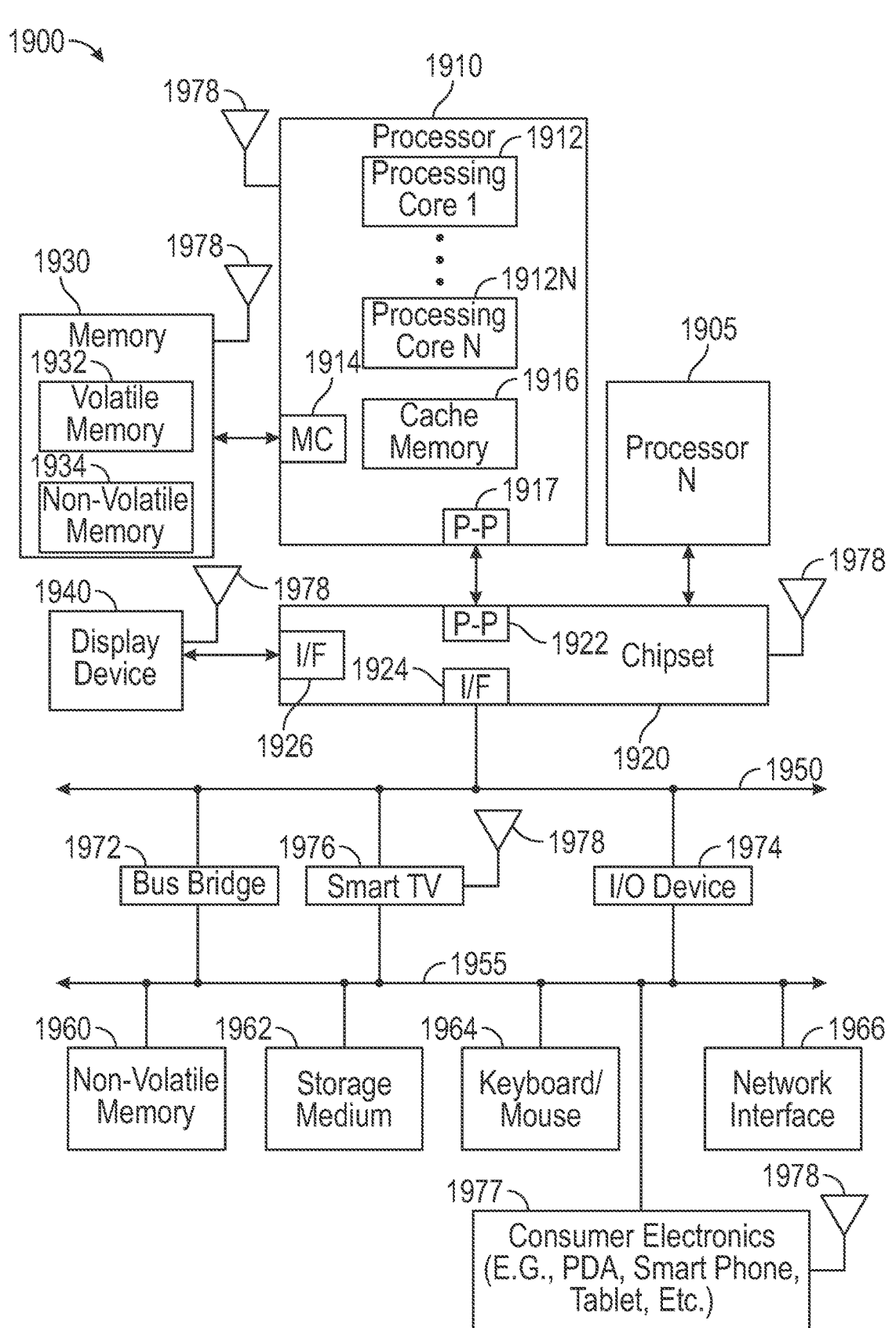
FIG. 14 illustrates a system level diagram, depicting an example of an electronic device (e.g., system) that can include, for example, a transmitter configured to selectively fan out a signal to one of multiple communication channels.

FIG. 14 illustrates a system level diagram, depicting an example of an electronic device (e.g., system) that can include, for example, a transmitter configured to selectively fan out a signal to one of multiple communication channels. FIG. 14 is included to show an example of a higher-level device application for the subject matter discussed above with regards to FIGS. 1-13. In one aspect, system 1900 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance, or any other type of computing device. In some aspects, system 1900 is a system on a chip (SOC) system.

In one aspect, processor 1910 has one or more processor cores 1912, . . . , 1912N, where 1912N represents the Nth processor core inside processor 1910 where N is a positive integer. In one aspect, system 1900 includes multiple processors including 1910 and 1905, where processor 1905 has logic similar or identical to the logic of processor 1910. In some aspects, processing core 1912 includes, but is not limited to, pre-fetch logic to fetch instructions, decode logic to decode the instructions, execution logic to execute instructions and the like. In some aspects, processor 1910 has a cache memory 1916 to cache instructions and/or data for system 1900. Cache memory 1916 may be organized into a hierarchal structure including one or more levels of cache memory.

In some aspects, processor 1910 includes a memory controller 1914, which is operable to perform functions that enable the processor 1910 to access and communicate with memory 1930 that includes a volatile memory 1932 and/or a non-volatile memory 1934. In some aspects, processor 1910 is coupled with memory 1930 and chipset 1920. Processor 1910 may also be coupled to a wireless antenna 1978 to communicate with any device configured to transmit and/or receive wireless signals. In one aspect, an interface for wireless antenna 1978 operates in accordance with, but is not limited to, the IEEE 802.11 standard and its related family, Home Plug AV (HPAV), Ultra Wide Band (UWB), Bluetooth, WiMax, or any form of wireless communication protocol.

In some aspects, volatile memory 1932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 1934 includes, but is not limited to, flash memory, phase change memory (PCM), read-only memory (ROM), electrically erasable programmable read-only memory (EEPROM), or any other type of non-volatile memory device.

Memory 1930 stores information and instructions to be executed by processor 1910. In one aspect, memory 1930 may also store temporary variables or other intermediate information while processor 1910 is executing instructions. In the illustrated aspect, chipset 1920 connects with processor 1910 via Point-to-Point (PtP or P-P) interfaces 1917 and 1922. Chipset 1920 enables processor 1910 to connect to other elements in system 1900. In some aspects of the example system, interfaces 1917 and 1922 operate in accordance with a PtP communication protocol such as the Intel® QuickPath Interconnect (QPI) or the like. In other aspects, a different interconnect may be used.

In some aspects, chipset 1920 is operable to communicate with processor 1910, 1905, display device 1940, and other devices, including a bus bridge 1972, a smart TV 1976, I/O devices 1974, nonvolatile memory 1960, a storage medium (such as one or more mass storage devices) 1962, a keyboard/mouse 1964, a network interface 1966, and various forms of consumer electronics 1977 (such as a PDA, smart phone, tablet etc.), etc. In one aspect, chipset 1920 couples with these devices through an interface 1924. Chipset 1920 may also be coupled to a wireless antenna 1978 to communicate with any device configured to transmit and/or receive wireless signals.

Chipset 1920 connects to display device 1940 via interface 1926. Display device 1940 may be, for example, a liquid crystal display (LCD), a plasma display, cathode ray tube (CRT) display, or any other form of visual display device. In some aspects of the example system, processor 1910 and chipset 1920 are merged into a single SOC. In addition, chipset 1920 connects to one or more buses 1950 and 1955 that interconnect various system elements, such as I/O devices 1974, nonvolatile memory 1960, storage medium 1962, a keyboard/mouse 1964, and network interface 1966. Buses 1950 and 1955 may be interconnected together via a bus bridge 1972.

In one aspect, storage medium 1962 includes, but is not limited to, a solid-state drive, a hard disk drive, a universal serial bus flash memory drive, or any other form of computer data storage medium. In one aspect, network interface 1966 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one aspect, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 14 are depicted as separate blocks within the system 1900, the functions performed by some of these blocks may be integrated within a single semiconductor circuit or may be implemented using two or more separate integrated circuits. For example, although cache memory 1916 is depicted as a separate block within processor 1910, cache memory 1916 (or selected aspects of 1916) can be incorporated into processor core 1912.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "an example aspect", "some aspects", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a hand-held device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may, for example, be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016); IEEE 802.11ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing WiFi Alliance (WFA) Peer-to-Peer (P2P) specifications (including WiFi P2P technical specification, version 1.5, Aug. 4, 2015) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting and/or the action of receiving. In one example, the phrase "communicating a signal" may refer to the action of transmitting the signal by a first device and may not necessarily include the action of receiving the signal by a second device. In another example, the phrase "communicating a signal" may refer to the action of receiving the signal by a first device and may not necessarily include the action of transmitting the signal by a second device.

Some demonstrative aspects may be used in conjunction with a wireless communication network communicating over a frequency band above 45 Gigahertz (GHz), e.g., 60 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a frequency band above 45 GHz, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

As used herein, the term "circuitry" may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna" or "antenna array", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/ receive elements. The antenna may include, for example, a phased array antenna, a single element antenna, a set of switched beam antennas, and/or the like.

Additional Notes and Aspects

Example 1 is a radio-head (RH) apparatus comprising: synchronization circuitry configured to: receive transmission data and a phase correction signal; and process the transmission data and the phase correction signal to generate digital transmitter (DTX) codes; and transmission circuitry coupled to the synchronization circuitry and configured to: combine the phase correction signal with transmission data codes to be provided to the DTX for transmission over an air interface.

In Example 2, the subject matter of Example 1 can optionally include detection circuitry configured to: measure a phase of a local frequency source relative to that of a system reference source; and generate a representation of a discrepancy between phases of the two frequency sources;

and processing circuitry coupled to the detection circuitry and configured to: receive the representation of the discrepancy; generate the phase correction signal based on the representation of the discrepancy; and provide the phase correction signal to the synchronization circuitry.

In Example 3, the subject matter of Example 2 can optionally include wherein a system reference signal corresponding to the system reference source is received through a specialized analog channel.

In Example 4, the subject matter of any one of Examples 2-3 can optionally include wherein the synchronization circuitry comprises a Digital Front End (DFE), and wherein the DFE is coupled to a high-speed serial (HSS) interface to receive the phase correction signal.

In Example 5, the subject matter of Example 4 can optionally include wherein the DFE is configured to convert a representation of the discrepancy into digital time converter (DTC) codes.

In Example 6, the subject matter of Example 5 can optionally include wherein the synchronization circuitry further comprises a modulated local oscillator (MOLO) and wherein the MOLO is configured to re-sample the DTC codes.

In Example 7, the subject matter of any one Examples 1-6 can optionally include wherein the RH apparatus is further configured to subtract the phase correction signal from transmission data codes to generate the transmission signal.

Example 8 is a radio-head (RH) apparatus comprising: base-band circuitry comprised of: synchronization circuitry configured to: receive a base-band signal and phase correction signal; perform carrier frequency offset correction (CFOC) to shift a center frequency of the base-band signal using phase correction signal; and perform sampling frequency offset correction (SFOC) to resample the shifted base-band signal to generate a resampled base-band signal; and transmission circuitry coupled to the base-band circuitry and configured to: provide the resampled base-band signal over an air interface.

In Example 9, the subject matter of Example 8 can optionally include detection circuitry configured to: measure a phase of a local frequency source relative to that of a system reference source; and generate a representation of a discrepancy between the phases of the two frequency sources; and processing circuitry coupled to detection circuitry and configured to: receive the representation of the discrepancy: generate a phase correction signal based on the representation of the discrepancy: and provide the phase correction signal to the synchronization circuitry.

In Example 10, the subject matter of any one of Examples 8-9 can optionally include wherein the synchronization circuitry is configured to perform CFOC by converting a phase error of the phase correction signal to a complex exponent and multiplying the base-band signal by the complex exponent.

In Example 11, the subject matter of Example 10 can optionally include wherein the synchronization circuitry is configured to perform SFOC by determining a desired sampling rate of the shifted base-band signal, and to perform an interpolation operation to resample the shifted base-band signal.

In Example 12, the subject matter of Example 9 can optionally include wherein a desired sampling rate is determined based on phase correction signal.

In Example 13, the subject matter of Example 9 can optionally include a variable rate converter (VRC) and wherein the VRC is configured to perform SFOC.

In Example 14, the subject matter of any one of Examples 8-13 can optionally include wherein the transmission circuitry comprises digital transmission circuitry.

In Example 15, the subject matter of any one of Examples 8-14 can optionally include wherein the transmission circuitry comprises analog transmission circuitry.

Example 16 is a system comprising: a base-band subsystem (BBSS) coupled at least two radio-head (RH) apparatuses, the BBSS comprising: detection circuitry configured to: measure a phase of a RH frequency sources relative to each other; generate a representation of a discrepancy between the phases of the two frequency sources; processing circuitry coupled to the detection circuitry and configured to: receive the representation of the discrepancy, generate a phase correction signal based on the representation of the discrepancy; and communicate the phase correction signal to at least one of the RHs over a high-speed serial (HSS) digital interface.

In Example 17, the subject matter of Example 16 can optionally include wherein each RH comprises a long-term stable oscillator used for generation of a frequency.

In Example 18, the subject matter of Example 17 can optionally include wherein the generated frequencies of each RH are provided to the BBSS over a specialized analog channel.

In Example 19, the subject matter of any one of Examples 16-18 can optionally include wherein each RH further comprises a synchronization circuitry configured to receive the phase correction signal.

In Example 20, the subject matter of Example 19 can optionally include wherein each RH further comprises a transmission circuitry configured to apply the phase correction signal to amend an instantaneous phase of a transmitted signal.

Example 21 is a system comprising means for performing any one of Examples 1-20.

Example 22 is a method of performing any one of Examples 1-20.

Example 23 is a computer readable medium comprising instructions for performing any of Examples 1-20.

The above detailed description includes references to the accompanying drawings, which form a part of the detailed description. The drawings show, by way of illustration, specific aspects in which the invention can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect, and it is contemplated that such aspects can be combined with each other in various combinations or permutations. The scope of the invention should be determined with reference to the appended claims, along with the full scope of equivalents to which such claims are legally entitled.

What is claimed is:

1. A radio-head (RH) apparatus comprising:
synchronization circuitry configured to:
    measure a phase discrepancy between a local frequency source and a system reference frequency source to generate a phase correction signal;
    receive transmission data and the phase correction signal; and
    process the transmission data and the phase correction signal in a feed-forward manner to generate digital transmitter (DTX) codes for distributed radio transmission; and
transmission circuitry coupled to the synchronization circuitry and configured to:
    combine the phase correction signal with transmission data codes to be provided to the DTX for transmission over an air interface.

2. The RH apparatus of claim 1, further comprising:
detection circuitry configured to:
generate a representation of the phase discrepancy between phases of the local frequency source and the system reference frequency source; and
processing circuitry coupled to the detection circuitry and configured to:
    receive the representation of the discrepancy;
    generate the phase correction signal based on the representation of the phase discrepancy; and
provide the phase correction signal to the synchronization circuitry.

3. The RH apparatus of claim 2, wherein a system reference signal corresponding to the system reference frequency source is received through a specialized analog channel.

4. The RH apparatus of claim 2, wherein the synchronization circuitry comprises a Digital Front End (DFE), and wherein the DFE is coupled to a high-speed serial (HSS) interface to receive the phase correction signal.

5. The RH apparatus of claim 4, wherein the DFE is configured to convert a representation of the discrepancy into digital time converter (DTC) codes.

6. The RH apparatus of claim 5, wherein the synchronization circuitry further comprises a modulated local oscillator (MOLO) and wherein the MOLO is configured to re-sample the DTC codes.

7. The RH apparatus of claim 1, further configured to subtract the phase correction signal from transmission data codes to generate a transmission signal.

8. A radio-head (RH) apparatus comprising:
base-band circuitry comprised of:
    synchronization circuitry configured to:
        measure a phase discrepancy between a local frequency source and a system reference frequency source to generate a phase correction signal;
        receive a base-band signal and the phase correction signal;
        perform carrier frequency offset correction (CFOC) to shift a center frequency of the base-band signal using the phase correction signal in a feed-forward manner to generate a shifted base-band signal; and
        perform sampling frequency offset correction (SFOC) to resample the shifted base-band signal to generate a resampled base-band signal for distributed radio transmission; and
    transmission circuitry coupled to the base-band circuitry and configured to:
        provide the resampled base-band signal over an air interface.

9. The RH apparatus of claim 8 further comprising:
detection circuitry configured to:
    generate a representation of the phase discrepancy between phases of the local frequency source and the system reference frequency source; and
processing circuitry coupled to the detection circuitry and configured to:
    receive the representation of the discrepancy;
    generate the phase correction signal based on the representation of the phase discrepancy; and
    provide the phase correction signal to the synchronization circuitry.

10. The RH apparatus of claim 8, wherein the synchronization circuitry is configured to perform CFOC by converting a phase error of the phase correction signal to a complex exponent and multiplying the base-band signal by the complex exponent.

11. The RH apparatus of claim 10, wherein the synchronization circuitry is configured to perform SFOC by determining a desired sampling rate of the shifted base-band signal, and to perform an interpolation operation to resample the shifted base-band signal.

12. The RH apparatus of claim 9, wherein a desired sampling rate is determined based on phase correction signal.

13. The RH apparatus of claim 9, further comprising a variable rate converter (VRC) and wherein the VRC is configured to perform SFOC.

14. The RH apparatus of claim 8, wherein the transmission circuitry comprises digital transmission circuitry.

15. The RH apparatus of claim 8, wherein the transmission circuitry comprises analog transmission circuitry.

16. A system comprising:
a base-band sub-system (BBSS) coupled to at least two radio-head (RH) apparatuses, the BBSS comprising:
    detection circuitry configured to:
        measure a phase discrepancy between a local frequency source of a RH and a system reference frequency source to generate a phase correction signal;
    processing circuitry coupled to the detection circuitry and configured to:
        receive the phase correction signal; and
        communicate the phase correction signal to at least one of the RHs over a high-speed serial (HSS) digital interface in a feed-forward manner for distributed radio transmission.

17. The system of claim 16, wherein each RH comprises a long-term stable oscillator used for generation of a frequency.

18. The system of claim 17, wherein the frequency of each RH is provided to the BBSS over a specialized analog channel.

19. The system of claim 16, wherein each RH further comprises a synchronization circuitry configured to receive the phase correction signal.

20. The system of claim 19, wherein each RH further comprises a transmission circuitry configured to apply the phase correction signal to amend an instantaneous phase of a transmitted signal.

\* \* \* \* \*